(12) United States Patent
Berkner et al.

(10) Patent No.: US 7,206,459 B2
(45) Date of Patent: Apr. 17, 2007

(54) ENHANCEMENT OF COMPRESSED IMAGES

(75) Inventors: Kathrin Berkner, Palo Alto, CA (US); Michael J. Gormish, Los Altos, CA (US); Edward L. Schwartz, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 919 days.

(21) Appl. No.: 09/920,003

(22) Filed: Jul. 31, 2001

(65) Prior Publication Data

US 2003/0086623 A1 May 8, 2003

(51) Int. Cl.
- *G06K 9/36* (2006.01)
- *G06K 9/38* (2006.01)
- *G06K 9/46* (2006.01)
- *G06K 9/40* (2006.01)

(52) U.S. Cl. .................. 382/251; 382/233; 382/235; 382/275

(58) Field of Classification Search ............... 382/233, 382/235, 238, 239, 251, 275, 240, 268
See application file for complete search history.

(56) References Cited

U.S. PATENT DOCUMENTS

| 5,568,142 | A |   | 10/1996 | Velazquez et al. |
| 5,610,729 | A |   | 3/1997  | Nakajima |
| 5,974,181 | A | * | 10/1999 | Prieto ............... 382/232 |
| 6,985,632 | B2 | * | 1/2006 | Sato et al. ............ 382/240 |
| 2001/0014179 | A1 | * | 8/2001 | Tan et al. ............ 382/240 |
| 2002/0003905 | A1 | * | 1/2002 | Sato et al. ............ 382/240 |

FOREIGN PATENT DOCUMENTS

| JP | 09172639 A | 6/1997 |
| JP | 10507891 T2 | 7/1998 |
| JP | 2001-136526 | 5/2001 |

OTHER PUBLICATIONS

Neelamani, R., et al. "Wavelet-Based Deconvolution for Ill-Conditioned Systems," Acoustics, Speech and Signal Processing, 1999. Proceedings 1999 IEEE International Conf. On Phoenix, Az., USA 15-19, Mar. 1999, Piscataway, NJ., pp. 3241-3244.

Santa Cruz, Diego, et al., "The JPEG 2000 Image Coding Standard A Powerful Algorithm and Data Format," Dr. Dobb's Journal, M&T Publ., Redwood City, CA., vol. 26, No. 4, Apr. 2001, pp. 46-54.

Shen, Mei-Yen, et al., "Review of Postprocessing Techniques for Compression Artificat Removal," Journal of Visual Communication and Image Representation, Academic Press, Inc. vol. 9, No. 1, Mar. 1998, pp. 2-14.

(Continued)

*Primary Examiner*—Jingge Wu
*Assistant Examiner*—Wes Tucker
(74) *Attorney, Agent, or Firm*—Blakely, Sokoloff, Taylor & Zafman LLP

(57) ABSTRACT

A method and apparatus for enhancing compressed images is described. In one embodiment, the method comprises characterizing quantization noise in reconstructed low pass coefficients generated in response to application of an inverse wavelet transform and removing the quantization noise from the reconstructed low pass coefficients constructed during decoding.

72 Claims, 23 Drawing Sheets

OTHER PUBLICATIONS

Xiong, Ziziang, et al., "A Simple Deblocking Algorithm for JPEG Compressed Images Using Overcomplete Wavelet Representations," Circuits and Systems, Proceedings of 1997 IEEE International Symposium on Hong Kong Jun. 9-12, 1997, NY, NY, pp. 1077-1080.

Choi, Hyuk, et al., "Blocking-Artifact Reduction in Block-Coded Images Using Wavelet-Based Subband Decomposition," IEEE Transactions on Circuits and Systems for Video Technology, IEEE Inc., NY, vol. 10, No. 5, Aug. 2000, pp. 801-805.

* cited by examiner

ENHANCEMENT OF COMPRESSED IMAGES

FIELD OF THE INVENTION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

The present invention relates to the field of decompression and compression systems; more particularly, the present invention relates to enhancement of compressed images, such as, for example, those that are decoded by a decoder compliant with the JPEG 2000 Standard.

BACKGROUND OF THE INVENTION

At lower bitrates, compressed images often show some artifacts due to the quantization of transform coefficients. The nature of these artifacts depends very much on the chosen transform and quantization scheme. The artifacts are often called quantization noise. It is well known that wavelet-based noise removal is the state-of-the-art technique for removal of Gaussian White noise due to fundamental different theoretical properties of wavelet compared with Fourier bases. The characteristics of quantization noise are very different from Gaussian White noise and the familiar wavelet-shrinkage technique is not applicable.

The new image compression standard JPEG2000 ("J2K") contains very sophisticated quantization schemes that are known to the encoder and decoder. See ITU-T T.800/ISO/IEC 154441:2000 JPEG 2000 Image Coding System.

Removal of compression artifacts caused by DCT compression is known in the art. Those artifacts are mostly blocky artifacts due to the 8×8 transform blocks. Typically, the position of the boundary between two transform blocks is known and the processing concentrated around those blocks. For more information, see Shen, M. -Y., Kuo, C. -C., "Review of Postprocessing Techniques for Compression Artifact Removal," *Journal of Visual Communication and Image Representation*, vol. 9, pp. 2–14, 1998 and Xiong, Z., Orchard, M., Zhang, Y., "A Deblocking Algorithm for JPEG Compressed Images Using Overcomplete Wavelet Representations," *IEEE Trans. Circuits and Systems for Video Technology*, vol. 7, pp. 433–437, 1997.

There has been some work on artifact removal at tile boundaries with wavelet compression systems, which is a similar problem to artifact removal at DCT block boundaries. The original JPEG Standard uses DCT, as opposed to the J2K, which uses a wavelet transform. For more information on the JPEG Standard, see ITU-T Recommendation T.81 I ISO/IEC 10918–1:1994, Information Technology— Digital Compression and Coding of Continuous-Tone Still Images: Requests and Guidelines.

Some postprocessing methods for removal of quantization noise in wavelet compression systems exist. In Nguyen, T., Yang, S., Hu, Y. H., Tull, D. L., "JPEG-2000 post processing" presented at a J2K meeting, 1999, a MAP-estimation algorithm is applied to the image which requires an estimate of the original image. In general applications that estimate is not available. Moreover, it is not possible to embed this technique into the decoder. Another approach is used in Wei, D., Burrus, C. S., "Optimal Wavelet Thresholding for Various Coding Schemes," in Proceedings of ICIP '95, vol. 1, pp. 610–613, 1995, where the authors apply a simple wavelet-denoising algorithm to the quantized data. That denoising algorithm is specifically suited for Gaussian White noise. Quantization noise is by no means Gaussian White noise. In contrast, wavelet coefficients after quantization can take only a limited number of values given through the quantization. Therefore, the thresholding scheme for Gaussian noise that the authors set forth is not an optimal technique for removal of quantization noise. In Nosratinia, A., "Embedded Post-Processing for Enhancement of Compressed Images," in *Proceedings of Data Compression Conference DCC*, pp. 62–71, 1999, an algorithm for artifact removal in DCT JPEG/wavelet-compressed images is presented that computes different shifts of the fully decoded image and clips coefficients to the quantization. However, this is also a postprocessing step that requires first a decoding of the entire image.

Correcting blurring is another problem for which image processing is performed. Sensing devices for digitizing images such as a scanner or a CCD camera typically produce a blurred version of the original image. Therefore, deblurring algorithms are necessary to produce a digital image that has the same degree of sharpness as the original image. Deblurring of images is a classical part of image processing. Typically, the blurring process is modeled by a convolution with a smoothing kernel. An inversion of this blurring is done by dividing by the convolution kernel in the Fourier domain. An exact inverse is only possible if the convolution kernel does not have any zeros in its frequency response. Even if the kernel satisfies this criterion in the presence of noise, the deblurring problem becomes an ill-posed problem since noise pixels may be magnified during the filter inversion. If the convolution kernel is not invertible, a regularized inverse is typically used where a regularization parameter manages the trade off between full inversion and noise suppression.

Recently, hybrid Fourier-wavelet-based techniques have been proposed in the literature to solve the deconvolution problem. In those approaches, the denoising part of the deconvolution problem is performed by wavelet shrinkage, the inversion of the convolution in the Fourier domain by classical filter inversion. For more information, see Abramovich, F., Silverman, B. W., "Wavelet Decomposition Approaches to Statistical Inverse Problems," *Biometrika*, vol. 85, pp. 115–129, 1998; Donoho, D., "Nonlinear Solution of Linear Inverse Problems by Wavelet-Vaguelette Decomposition," *Journal of Applied and Computational Harmonic Analysis*, vol. 2, pp. 101–115, 1995; Neelamani, R., Choi, H., Baraniuk, R., "Wavelet-based Deconvolution for Ill-conditioned Systems," in Proceedings of ICASSP, vol. 6, pp. 3241–3244, 1998. S. Mallat, "A Wavelet Tour of Signal Processing," Academic Press, 1998.

Enhancement of images in a subband decomposition, especially using the Laplacian pyramid, is known in the art. For example, see Ito, W., "Method and Apparatus for Enhancing Contrast in Images by Emphasis Processing of a Multiresolution Frequency Band," Fuji, Japan, U.S. Pat. No. 5,907,642, issued May 24, 1999 and U.S. Pat. No. 5,960,123, issued Sep. 28, 1999.

U.S. Pat. No. 5,703,965, entitled "Image Compression/Decompression Based on Mathematical Transform, Reduction/Expansion, and Image Sharpening," issued to Chi-Yung, F., Loren, P. on Dec. 30, 1995 discusses two operations: compression and image sharpening and smoothing. In that approach, which assumes the original JPEG compression scheme, the two operations are performed one after the other and not combined into one.

SUMMARY OF THE INVENTION

A method and apparatus for enhancing compressed images is described. In one embodiment, the method comprises characterizing quantization noise in reconstructed samples generated in response to application of an inverse wavelet transform and removing the quantization noise from the reconstructed samples constructed during decoding.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
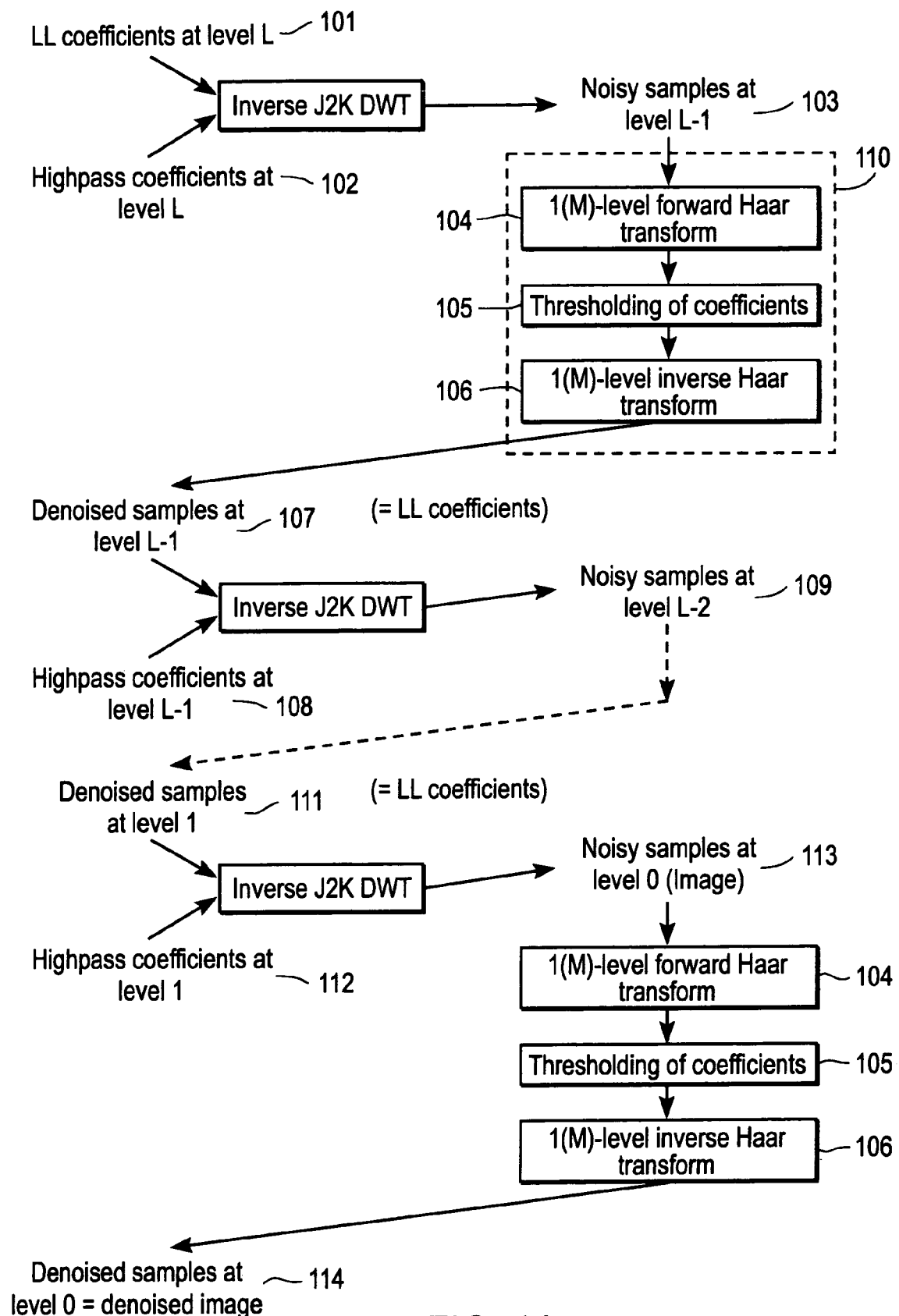
FIG. 1A is a flow diagram of one embodiment of a quantization noise removal process.

A method and apparatus for enhancing compressed images is described. The new JPEG 2000 decoding standard (ITU-T Rec.T.800/ISO/IEC 154441:2000 JPEG 2000 Image Coding System) (herein after referred to as the J2K Standard) provides a new coding scheme and codestream definition for images, and is incorporated herein by reference.

A technique is described that uses the information on the quantization scheme available to a decoder, such as, for example, a J2K decoder, to characterize quantization noise and removes that noise from samples reconstructed during the decoding process. For example, the techniques described herein may be used to enhance a J2K compressed image, where enhancement refers to a removal of quantization noise. The technique may be embedded into the decoder codestream and does not require decoding of the entire image first in order to perform the enhancement.

In one embodiment, this noise removal operation is combined with a deblurring operation to enhance the sharpness of a compressed image (e.g., a J2K compressed image). The techniques described herein could be used on images taken by a digital camera, or in other settings, where the input image has been blurred before the compression by a sensing device.

A technique for enhancement of J2K compressed images including removal of quantization artifacts and deblurring is described. In one embodiment, these techniques eliminate visual degradation in J2K compressed images by removing quantization artifacts and performing a deblurring operation if necessary. This removal of quantization artifacts and performance of the deblurring operation may be performed by applying "wavelet sharpening and smoothing" (WSS) to J2K quantized coefficients. For more information on WSS, see K. Berkner, E. L. Schwartz, M. J. Gormish, M. Boliek, "A New Wavelet-Based Approach to Sharpening and Smoothing of Images in Besov Spaces with Applications to Deblurring," Proceedings of ICIP/2000, Vancouver, Vol. III, pp. 797–800, 2000 and K. Berkner, E. L. Schwartz, M. J. Gormish, "Multiscale Sharpening and Smoothing in Besov Spaces with Applications to Image Enhancement," in Applied and Computational Harmonic Analysis, Special Issue on Wavelet Applications, Vol. 11, No. 1, pp. 2–31, July 2001, incorporated herein by reference. See also, U.S. patent application Ser. No. 09/467,544, entitled "Multiscale Sharpening and Smoothing With Wavelets," filed Dec. 10, 1999 and U.S. patent application Ser. No. 09/658,393, entitled "Wavelet-Based Image Processing Path," filed Sep. 8, 2000, assigned to the corporate assignee.

In one embodiment, the operations of removal of quantization artifacts and deblurring, and the functionality necessary to perform them, may be used in combination or separately, are embedded into the decoder, and these operations use information on the quantization specified in the J2K Standard and known to the J2K decoder.

In one embodiment, the techniques described herein are implemented as a decoder option. In such a case, there is no cost during encoding and lossless decoding.

Alternatively, some of the techniques described herein can be implemented in an encoder. In one embodiment, the technique enables enhancement of an image at various resolutions. Enhancement at a particular resolution might target a particular client or device such as, for example, a monitor. The J2K codestream can be parsed to give a codestream for the device or client.

In the following description, numerous details are set forth, such as types of transforms, parameter values, etc., in order to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Multiscale Sharpening, Smoothing and Denoising

In one embodiment, enhancement in the form of thresholding and/or scaling (e.g., multiplication) is performed on wavelet coefficients to achieve denoising, sharpening, and smoothing. A criterion dictates whether thresholding and/or multiplication are applied.

Denoising by Thresholding

Denoising may be performed by setting all coefficients below a given threshold to zero. This technique is known as hard-thresholding and is well-known in the art. As an alternative, soft-thresholding, e.g., shrinking the coefficients above the threshold toward zero by the amount of the threshold can also be considered. Such a technique may be advantageously used for critically sampled and overcomplete wavelet decompositions, and is described in Donoho, "Denoising by Soft-Thresholding", IEEE Transactions on Information Theory, 41(3): 613–627, 1995.

There are a number of choices of threshold selection that may be used. These may be calculated from a series of test images.

There are additional strategies for thresholding available. There may be a global threshold or different thresholds for different levels of decomposition or different bands (LH, HL, HH). The thresholds may be set manually.

It is important to note that wavelets outperform many other transforms for denoising. For example, Laplacian based techniques applied to wavelet compressed images do not achieve the quality level obtained with wavelet denoising systems. Laplacian pyramid decompositions can be used only for systems where inferior or no denoising is acceptable.

Rescaling of Coefficients

After any denoising is completed, the wavelet coefficients that are non-zero may be modified for the purpose of sharpening or smoothing.

In one embodiment, sharpening or smoothing of the image is obtained by multiplication of wavelet coefficients with a level-dependent parameter $\mu_l > 0$. For sharpening, the high frequency bands should be multiplied with a larger factor than the low frequency bands, whereas for smoothing the low frequency bands should be multiplied with larger factors than the high frequency bands. One way to obtain this resealing is to multiply the coefficients at level j with $\mu^j = R \cdot 2^{\alpha j}$. The parameter R functions as a renormalization factor for preserving the global energy of coefficients and $\alpha$ is the parameter that determines the degree of sharpening ($\alpha<0$) or smoothing ($\alpha>0$). For more information on such sharpening and smoothing, see K. Berkner, E. L. Schwartz, M. J. Gormish, M. Boliek, "A New Wavelet-Based Approach to Sharpening and Smoothing of Images in Besov Spaces with Applications to Deblurring," Proceedings of ICIP/2000, Vancouver, Vol. III, pp. 797–800, 2000 and K. Berkner, E. L. Schwartz, M. J. Gormish, "Multiscale Sharpening and Smoothing in Besov Spaces with Applications to Image Enhancement," in Applied and Computational Harmonic Analysis, Special Issue on Wavelet Applications, Vol. 11, No. 1, pp. 2–31, July 2001, incorporated herein by reference. See also, U.S. patent application Ser. No. 09/467,544, entitled "Multiscale Sharpening and Smoothing With Wavelets," filed Dec. 10, 1999 and U.S. patent application Ser. No. 09/658,393, entitled "Wavelet-Based Image Processing Path," filed Sep. 8, 2000, assigned to the corporate assignee and incorporated herein by reference.

There are many choices for the parameter R that depend on how the energy of an image is measured. One way would be to preserve the $L^2$ norm $$\sqrt{\sum_{i,j} |x_{i,j}|^2}$$

of the image before and after resealing, i.e. compute R with $$R^2 = \left(\sum_{j,k} |d_{j,k}|^2\right) / \left(\sum_{j,k} |\mu_j d_{j,k}|^2\right)$$

If the scanned image is assumed to have a Hoelder regularity of $\gamma$ (typically $\gamma \geq 1$), an approximation of $R^2$ can be obtained by the following estimate.

$$R^2 = \left[\frac{2^{(L+1)2\gamma} - 2^{2\gamma}}{2^{2\gamma} - 1}\right] / \left[\frac{2^{(L+1)2(\gamma+\alpha)} - 2^{2(\gamma+\alpha)}}{2^{2(\gamma+\alpha)} - 1}\right] \text{ for } \alpha + \gamma \neq 0$$

This approximation can be computed a-priori and does not depend on the actual values of wavelet coefficients. For cases where $\alpha+\gamma=0$ $$R^2 = \left[\frac{2^{(L+1)2\gamma} - 2^{2\gamma}}{2^{2\gamma} - 1}\right] / L.$$

Instead of using the $L^2$ norm, there are other choices for the norm. Using the theory of Besov spaces, it is possible to preserve a specific Besov norm of the image. This norm is defined as a weighted sum of wavelet coefficients. The parameter R can be computed as $$R^q = \left(\sum_j 2^{j(\alpha+q+1/2)}\left(\sum_k |d_{j,k}|^p\right)^{q/p}\right) / \left(\sum_j 2^{j(\alpha+q+1/2)}\left(\sum_k |\mu_j d_{j,k}|^p\right)^{q/p}\right)$$

for $0<p,q<\infty$.

For $p,q=\infty$, the term $$\left(\sum |\ldots|^s\right)^{1/s}$$

in the previous equation is substituted by $\sup|d_{j,k}|$.

In one embodiment, the choice of the parameters $\alpha$ and R can be controlled by the user interface of a device, giving the user the opportunity to select more/less sharpening, or more/less smoothing. This parameterization of sharpening and smoothing allows a fine graduation of degrees of enhancement.

The above technique may be used for deblurring of noisy images, in particular scanned documents. Thus, these techniques perform denoising and inversion of the blurring completely in the wavelet domain. The denoising part may be performed by shrinkage of coefficients, while the inversion of the blurring may be performed by reweighting of the denoised coefficients. These deblurring solutions are used as an individual processing operation on the original data of the blurred image, not on a compressed code stream.

Compression Artifact Removal and Deblurring of J2K Compressed Images

The denoising and/or deblurring may be used to reduce or eliminate artifacts due to quantization noise in compression images. In one embodiment, a technique is described for removal of quantization noise in a J2K encoded data stream. A technique for performing a deblurring operation using a process related to the wavelet sharpening and smoothing process described above on a J2K encoded data stream is also described. Those two techniques can be used separately or in combination to form an enhancement system. Such an enhancement system may be included in, for example, a digital camera, scanner, printer, digital copier, displays, post processing software, or embedded into the decoder.

Removal of Quantization Noise in J2K-Compressed Coefficients

Gaussian White noise is uniformly distributed in the levels of a wavelet decomposition and its strength can be estimated by computing the standard deviation of the coefficients at the finest level of decomposition. Quantization noise has a different characteristic. This noise appears when transform coefficients of very similar size end up in different quantization bins after applying the quantization. This mismatch of quantization bins becomes visible as an artifact after performing the inverse wavelet transform—especially in smooth regions of the image. It becomes clear that the characteristics of quantization noise artifacts in wavelet compressed images depend on the quantization procedure itself as well as the inverse transform.

The J2K Standard Part 1 makes multiple passes through coefficients in each subband. Some coefficients (those predicted to be significant) can be coded before adjacent coefficients. Each pass reduces the quantization "bin size" for some coefficients. In addition, the region of interest (ROI) functionality of Part 1 of the J2K Standard (in which use is indicated by the RGN marker) and the increased ROI functionality of Part 2 allow more changes in the order of coefficient processing and, thus, effectively more "bin sizes." In all cases, the decoder is aware of the number of bits decoded for each coefficient and, thus, the bound on the original coefficient.

An encoder in many compression systems performs scalar quantization. An encoder quantizes transform coefficients d of a subband to the value d' according to the following equation:

$$d' = \text{sign}(d) \cdot \left\lfloor \frac{|d|}{Q} \right\rfloor$$

where Q is the quantization step size.

The quantizer Q is used in encoding. In one embodiment, Q changes code-block to code-block or at different parts of the codestream. In the J2K standard, the decoder knows the Q value and when the Q value changes. In J2K Q value changes per coefficient. Such information is available as header information in the compressed codestream, (e.g., the number of coding passes in packet headers in J2K codestreams). This is also the case in other compression schemes.

The decoder typically uses $$\hat{d} = (d' + r)Q \quad \text{for } d' > 0, \quad (1)$$
$$\hat{d} = (d' - r)Q \quad \text{for } d' < 0, \text{ and} \quad (2)$$
$$\hat{d} = 0 \quad \text{for } d' = 0. \quad (3)$$

For this discussion, a value of ½ is used for r, but other values such as, for example, ⅜ may be used.

The decoder knows in which quantization bin d was placed, i.e.

$$Qd' \leq d \leq Q(d'+1).$$

Original coefficients "close" to nQ for integers $n \leq -2$ or $n \geq 2$ may be reconstructed as $(n-\frac{1}{2})Q$ or $(n+\frac{1}{2})Q$. Therefore, for two such close coefficients, the reconstructed value can differ by Q.

In one embodiment, the technique described herein uses that information on quantization schemes as well as the inverse wavelet transforms used to first characterize and then remove the quantization noise on each reconstructed LL component computed during the inverse wavelet transform.

Determining Quantization "Bin Size" for J2K Files

Annex E of the J2K standard describes quantization. The quantization bin size Q is $$Q = 2^{M_b - N_b(u,v)} \cdot \Delta_b.$$

The value $\Delta_b$ is the explicit scalar quantization step size for a given subband. For the reversible 5-3 transform, it is always 1. For the reversible 9-7 transform, $\Delta_b$ is signaled in QCD or QCC tags in a header (as described in Annex A). $M_b$ is $G + \epsilon_b - 1$, where G is the number of guard bits and $\epsilon_b$ is the exponent from the QCD or QCC tag. $N_b(u,v)$ is the number of bitplanes decoded for a particular coefficient at location u,v and $1 \leq N_b(u,v) \leq M_b$. ($N_b(u,v)$ can be zero, but in this is case all coefficients are zero—this is an all noise, no signal case.) A J2K codestream may contain less than $M_b$ bitplanes for a particular coefficient.

The number of bitplanes decoded, $$N_b(u,v) = P + C - \chi.$$

P is the number of zero bitplanes signalled in the packet header (described in Annex B). C is $$C = \left\lfloor \frac{(CP + 4)}{3} \right\rfloor$$

where CP is the total number of coding passes signalled in packet headers (or CP is a value less than the one signalled by the header chosen by the decoder).

Coefficients are coded in one of three coding passes: significance propagation, refinement or cleanup (as described in Annex D). $\chi$ is 0 or 1 as shown in Table K where % is the modulus operator (remainder after division) and the pass for each coefficient is determined by the J2K context model described in annex D.

TABLE 1

Value for $\chi$.

| CP%3 | last coding pass | $\chi$ for significance propagation (SP) pass coefficients | $\chi$ for refinement (RE) pass coefficients | $\chi$ for cleanup (CL) pass coefficients |
|---|---|---|---|---|
| 2 | significance propagation (SP) | 0 | 1 | 1 |
| 0 | refinement (RE) | 0 | 0 | 1 |
| 1 | cleanup (CL) | 0 | 0 | 0 |

An example follows below:
 reversible 5-3 transform, so $\Delta_b = 1$
 G=2, $\epsilon_b = 9$ from QCD or QCC tag, so $M_b = 10$
 P=4 from packet header for codeblock (zero bitplanes)
 CP=3 from packet header for codeblock. Since the first bitplane has only one coding pass, a cleanup pass, the 3 coding passes are:
 cleanup pass for the first non-zero bitplane
 significance propagation for the second non-zero bitplane
 refinement pass for the second non-zero bitplane
A refinement pass is last coding pass, and there is no cleanup pass for the second non-zero bitplane. C is 2 and from Table 1, $\chi$ is 0 for significance propagation pass and refinement pass coefficients and 1 for cleanup coefficients.
 When $\chi$ is 0, $N_b(u,v) = P+C-\chi = 6$, so $Q = 2^{10-6} \cdot 1 = 2^4 = 16$
 When $\chi$ is 1, $N_b(u,v) = P+C-\chi = 5$, so $Q = 2^{10-5} \cdot 1 = 2^5 = 32$ Therefore, if a codeblock consists of 12×1 coefficients in the following passes (SP=significance propagation pass, RE=refinement pass, CL=cleanup pass.)

| CL | CL | SP | RE | SP | RE | RE | SP | SP | RE | RE | SP |
|---|---|---|---|---|---|---|---|---|---|---|---| then, for each coefficient, $\chi$ is:

| 1 | 1 | 0 | 0 | 0 | 0 | 0 | 0 | 0 | 0 | 0 | 0 |
|---|---|---|---|---|---|---|---|---|---|---|---| and then, for each coefficient, Q is:

| 32 | 32 | 16 | 16 | 16 | 16 | 16 | 16 | 16 | 16 | 16 | 16 |

Characterization of Quantization Noise

The error that is being made by putting two similar wavelet coefficients in two different quantization bins is usually the same magnitude for all quantization bins, except in some instances e.g., where the zero bin is wider. (In such a case the difference can be 1.5Q) It is illustrated in the following example using a scalar quantization with Q=32.

TABLE 2

Example for quantization highpass coefficients, Q = 32.

| highpass coeffs d | 96 | 95 | 96 | 99 | 32 | 0 | 0 | 32 | 17 | −6 | 0 | 0 |
|---|---|---|---|---|---|---|---|---|---|---|---|---|
| quantized coeffs d' | 3 | 2 | 3 | 3 | 1 | 0 | 0 | 1 | 0 | 0 | 0 | 0 |
| reconstructed coeffs d̂ | 112 | 80 | 112 | 112 | 48 | 0 | 0 | 48 | 0 | 0 | 0 | 0 |

In Table 2 above, with Q being 32, the quantized coefficients d' represent the result of dividing the high pass coefficients by Q and rounding it. The value 80 in the reconstructed coefficients d̂ being vastly different than its neighboring reconstructed coefficients (both at 112) causes an artifact. (An error of 32 which is the quantization bin size).

An example for quantization of highpass coefficients with different numbers of coding passes:

TABLE 3

Example for quantization highpass coefficients, depending on significance values that change Q.

| highpass coefficients d | 96 | 95 | 96 | 99 | 32 | 0 | 0 | 32 | 17 | −6 | 0 | 0 |
|---|---|---|---|---|---|---|---|---|---|---|---|---|
| quantizer Q | 32 | 32 | 16 | 16 | 16 | 16 | 16 | 16 | 16 | 16 | 16 | 16 |
| quantized coeffs d' | 3 | 2 | 6 | 6 | 2 | 0 | 0 | 2 | 1 | 0 | 0 | 0 |
| reconstructed coeffs d̂ | 112 | 80 | 104 | 104 | 40 | 0 | 0 | 40 | 24 | 0 | 0 | 0 |

Note that the quantizer Q changes from 32 to 16. In this case, there is a mismatch of 32 on one side of the $2^{nd}$ coefficient and 24 on the other side.

A finer distinction is made by looking at the smoothness of the reconstructed image. A mismatch in the quantization bin may lead to an "outlier" in the reconstructed lowpass component. This outlier is the result of applying the inverse transform to the mismatched quantized coefficients. Therefore, the size A of the difference between the outlier and its neighbors theoretically be determined by the information given on the quantization and inverse wavelet transform. In other words, the maximum difference between coefficients is identified. In one embodiment, the maximum difference is assumed to be a multiple of Q. This is illustrated at the following example using the reversible 5-3 wavelet transform.

The forward transform is characterized as follows:

$$Y^H(2n+1) = X(2n+1) - \left\lfloor \frac{X(2n) + X(2n+2)}{2} \right\rfloor.$$

where odd-indexed coefficients of output signal Y are computed first for all values of n such that $$\left\lceil \frac{i_0}{2} \right\rceil - 1 \le n < \left\lceil \frac{i_1}{2} \right\rceil,$$

and $$Y^L(2n) = X(2n) + \left\lfloor \frac{Y(2n-1) + Y(2n+1) + 2}{4} \right\rfloor$$

where the even-indexed coefficients of output signal Y are computed from the even-indexed values of extended signal X and the odd-indexed coefficients of signal Y for all values of n such that $$\left\lceil \frac{i_0}{2} \right\rceil \le n < \left\lceil \frac{i_1}{2} \right\rceil.$$

The values of Y(k) such that $i_0 \leq k < i_1$ form the output.

The inverse transform is characterized as follows:

$$X(2n) = Y^L(2n) - \left\lfloor \frac{Y^H(2n-1) + Y^H(2n+1) + 2}{4} \right\rfloor \text{ for}$$

$$\left\lfloor \frac{i_0}{2} \right\rfloor \leq n < \left\lfloor \frac{i_1}{2} \right\rfloor + 1,$$

$$X(2n+1) = Y^H(2n+1) + \left\lfloor \frac{X(2n) + X(2n+2)}{2} \right\rfloor \text{ for}$$

$$\left\lfloor \frac{i_0}{2} \right\rfloor \leq n < \left\lfloor \frac{i_1}{2} \right\rfloor.$$

The values of X(k) such that $i_0 \leq k < i_1$ form the output. Note that $Y^H$ is d when encoding and d̂ when decoding.

Considering a quantization error of Q, then the difference between $Y_{2n-1}^H$ and $Y_{2n+1}^H$ is at least Q. As a consequence, for a one-dimensional transform, the reconstruction error is of order ¼Q for even reconstructed lowpass coefficients and ¾Q for odd reconstructed lowpass coefficients (see Table 4 below).

TABLE 4

Reconstruction Error Using a Q and the 1-D 5-3 Transform.

| quantizer Q | error | Q = 8 | Q = 16 | Q = 32 |
|---|---|---|---|---|
| X(2m) | ¼Q | 2 | 4 | 8 |
| X(2m + 1) | ¾Q | 6 | 12 | 24 |

Thus, the technique described herein examines differences between quantized coefficients and generates a threshold by which to characterize that difference.

Characterization of Quantization Noise and Threshold Selection for the 2D Case

In J2K, and in general for image compression, a two-dimensional (2D) wavelet transform is used. In J2K, a 2D forward wavelet transform is performed by applying a 1D vertical forward transform to the image columns and then applying a 1D horizontal forward transform to the rows of vertical transform coefficients. The 2D inverse wavelet transform is performed by applying a 1D horizontal inverse transform to coefficient rows followed by a 1D vertical inverse transform.

Coefficients for the 2D transform are named:
LL horizontal lowpass, vertical lowpass
HL horizontal highpass, vertical lowpass
LH horizontal lowpass, vertical highpass
HH horizontal highpass, vertical highpass
HL, LH, HH are all considered detail coefficients or highpass coefficients.

In the following, it is assumed that the LL coefficient are not quantized, but the detail coefficients are. In some applications it might be that also the LL coefficients are quantized, but the LL-quantization is much less than the quantization of the detail coefficients and can, therefore, be ignored in the following calculations.

In general, it is assumed that visible compression artifacts occur if two similar wavelet coefficients are divided into different quantization bins. For example, if Q equals 8, then 7 belongs is quantized to 0 and reconstructed as 4 (noise 3), whereas 8 is quantized to 1 and reconstructed as 12 (noise 4). That means a reconstructed wavelet coefficients contain quantization noise of magnitude $\leq Q/2$.

The inverse transform on rows of LL and HL components are as follows:

$$X^L(2N) = Y^{LL}(2N) - \lfloor \frac{1}{4}(Y^{HL}(2N-1) + Y^{HL}(2N+1)) + \frac{1}{2} \rfloor$$

$$X^L(2N+1) = Y^{HL}(2N+1) + \lfloor \frac{1}{2}(X^L(2N) + X^L(2N+2)) \rfloor$$

Following the 1D approach, the coefficients $X^L_{2N}$ contain a noise term of ¼Q due to the quantization of the $Y^{HL}$ coefficients. The coefficients $X^L_{2N+1}$ will contain a noise term smaller or equal to (½+¼)Q, which equals ¾Q.

The inverse transform on rows of LH and HH components are as follows:

$$X^H(2N) = Y^{LH}(2N) - \lfloor \frac{1}{4}(Y^{HH}(2N-1) + Y^{HH}(2N+1)) + \frac{1}{2} \rfloor$$

$$X^H(2N+1) = Y^{HH}(2N+1) + \lfloor \frac{1}{2}(X^H(2N) + X^H(2N+2)) \rfloor$$

Since the quantized coefficients $Y^{LH}$ are used in this part of the inverse transform instead of the non-quantized coefficient $Y^{LL}$, which were used previously, the coefficients $X^H(2N)$ will contain a noise term of (½+¼)Q. The coefficients $X^H(2N+1)$ will contain a noise term smaller or equal to (½+¾)Q which equals ⁵⁄₄Q. The magnitude of the quantization noise after the inverse transform on columns is summarized in Table 5 below.

TABLE 5

Magnitude of Quantization Noise After Horizontal Inverse Transform

| coefficients | Error | Q = 8 | Q = 16 | Q = 32 |
|---|---|---|---|---|
| $X^L(2N,·)$ | ¼Q | 2 | 4 | 8 |
| $X^L(2N + 1,·)$ | ¾Q | 6 | 12 | 24 |
| $X^H(2N,·)$ | ¾Q | 6 | 12 | 24 |
| $X^H(2N + 1,·)$ | ⁵⁄₄Q | 10 | 20 | 40 |

In the notation (2N,•) or (2N+1,•), the "•" represents all the elements in the row.

The inverse transform on columns of $X^L$ and $X^H$ components are as follows:

$$X(2N,2N) = X^L(2N,2N) - \lfloor \frac{1}{4}(X^H(2N,2N-1) + X^H(2N,2N+1)) + \frac{1}{2} \rfloor$$

$$X(2N,2N+1) = X^H(2N,2N+1) + \lfloor \frac{1}{2}(X(2N,2N) + X(2N,2N+2)) \rfloor$$

$$X(2N+1,2N) = X^L(2N+1,2N) - \lfloor \frac{1}{4}(X^H(2N+1,2N-1) + X^H(2N+1,2N+1)) + \frac{1}{2} \rfloor$$

$$X(2N+1,2N+1) = X^H(2N+1,2N+1) + \lfloor \frac{1}{2}(X(2N+1,2N) + X(2N+1,2N+2)) \rfloor$$

Quantization noise contained in the components after the inverse transforms on rows is displayed in Table 6 below.

TABLE 6

Maximum Magnitude of Quantization Noise After Complete Inverse Transform

| Coefficients | Error | Q = 8 | Q = 16 | Q = 32 |
|---|---|---|---|---|
| X(2N,2N) ± X(2N,2N + 1) | 2Q | 16 | 32 | 64 |
| X(2N + 1,2N) ± X(2N + 1,2N + 1) | 4Q | 32 | 64 | 128 |

Removal of Quantization Noise

Using this knowledge on quantization, a denoising of the reconstructed L coefficients is performed. This is illustrated with a 1-dimensional example. In order to remove the outlier and smooth out the smooth region, a redundant Haar wavelet transform (filter $$\frac{1}{\sqrt{2}}[1 1], \frac{1}{\sqrt{2}}[1 -1]$$

is computed on samples. This transform computes the differences between neighboring samples. On the wavelet coefficients of that transform, in one embodiment, a thresholding of coefficients is performed in the following way. The Haar wavelet coefficients computed from $X(2N,2N), X(2N,2N+1), X(2N+1,2N), X(2N+1,2N+1)$ result in $(X(2N,2N)+X(2N,2N+1)-X(2N+1,2N)-X(2N+1,2N+1))/2;$ $(X(2N,2N)-X(2N,2N+1)+X(2N+1,2N)-X(2N+1,2N+1))/2;$ and $(X(2N,2N)-X(2N,2N+1)-X(2N+1,2N)+X(2N+1,2N+1))/2.$ Using the results from Table 6, the maximal noise terms contained in the Haar coefficients are approximately of order $(2Q+4Q)/2$, which equals $3Q$.

A highpass Haar wavelet coefficient d is set to zero if $|d|<T$ and is kept if $|d|\geq T$. From the estimation on the error between two mismatched coefficients given above in Tables 4 and 6, a threshold T for the Haar wavelet coefficients can be derived as $T=(\text{error}[X(2m)]+\text{error}[X(2m+1)])/\sqrt{2}$ for the 1-dimensional transform and $T=(\text{error}[X(2N,2N)\pm X(2N,2N+1)]+\text{error}[X(2N+1,2N)\pm X(2N+1,2N+1)])/2$ for the 2-dimensional transform.

These thresholds are upper bounds that might be too large for many applications. The threshold for the 2-dimensional transform can often be lowered. Most visible quantization noise is created when one single coefficient is pushed into a different quantization bin than all of its surrounding neighbors. As a result, wavelet basis vectors show up as artifacts on smooth regions. In one embodiment, in order to remove those isolated basis vectors, the 2-dimensional threshold can be lowered as described in the following operations:

(1) Take the lowpass and high pass filter of the inverse transform and write them as vectors filter_low=[ . . . ], filter_high=[ . . . ].
(2) Compute the matrices
  $M_{HL}=(\text{filter\_high})^T \cdot \text{filter\_low}$
  $M_{LH}=M_{HL}^T$
  $M_{HH}=(\text{filter\_high})^T \cdot \text{filter\_high}$.
(3) Perform one level of a redundant Haar transform on the matrices M.
(4) Set the threshold $T_{min}$ as the (maximum of the absolute values of all the wavelet coefficients)·Q for 2-dim signals.
(5) Set the threshold $T_{min}$ as the (maximum of the absolute values of the wavelet coefficients of filter_high)·Q for 1-dim signals For the irreversible 5-3 wavelet system with lowpass filter [0.5 1 0.5] and highpass filter [−0.125−0.25 0.75−0.25−0.125] $T_{min}$ results in $T_{min}=\frac{3}{4} Q$ for the 2-dimensional transform and $T_{min}=Q/\sqrt{2}$ for the 1-dimensional transform.

For the Daubechies 9-7 filter the lowpass and highpass filters are given as:

lowpass =[−0.0912−0.0575 0.5912 1.1150 0.5912−0.0575−0.0912], highpass=[0.0267 0.0168−0.0782−0.2668 0.6029−0.2668−0.0782 0.0168 0.0267].

The threshold $T_{min}$ results as $T_{min}=0.7471 \cdot Q$ for the 2-dimensional transform and $T_{min}=0.6150 \cdot Q$ for the 1-dimensional transform.

Given lowpass and highpass filters of the inverse transform, a maximum threshold similar to the one derived for the reversible 5-3 transform in Table 7 can be derived by computing the maximal error being propagated through the inverse transform allowing more than just one coefficient in a neighborhood having maximal quantization error. In one embodiment, the operations for computing that threshold $T_{max}$ are:

(1) Take the lowpass and high pass filter of the inverse transform and write them as vectors F=filter_low=[ . . . ], G=filter_high=[ . . . ].
(2) Denote the two subsampled versions of the filters by $F_0, F_1$ and $G_0, G_1$.
(3) Compute the matrix $$M = \begin{bmatrix} \|F_0\| & \|G_0\| \\ \|F_1\| & \|G_1\| \end{bmatrix}, \text{ where } \|F\| \text{ denotes the } l_1-\text{norm} \sum_k |F(k)|.$$

(4) Denote the entries in M as m1,m2,m3,m4 and compute $T_{max}$ as $T_{max}=(m1+m2+m3+m4)/2$.

In most applications, it is advised to choose a threshold between $T_{min}$ and $T_{max}$. A good choice is $T_{middle}=\max(T_{min}, \frac{1}{2}T_{max})$.

A summary of the different treshold for the reversible 5-3 and the Daubechies 9-7 transform is given in Table 7.

TABLE 7

Thesholds for Thresholding Quantization Noise after a Haar Transform

| 2-dimensional transforms | error | Q = 8 | Q = 16 | Q = 32 |
|---|---|---|---|---|
| $T_{min}$ [rev 53 ] | 0.75 Q | 6 | 12 | 24 |
| $T_{max}$ [rev 53 ] | 3 Q | 24 | 48 | 96 |
| $T_{middle}$ [rev 53] | 1.5 Q | 12 | 24 | 48 |
| $T_{min}$ [97] | 0.7471 Q | 5.9768 | 11.9536 | 23.9072 |
| $T_{max}$ [97] | 4.5326 Q | 36.2608 | 72.5216 | 145.0432 |
| $T_{middle}$ [07] | 2.2663 Q | 18.1304 | 36.2608 | 72.5216 |

In the situation that coefficients of the same size are quantized with different values of Q (this is known to the decoder), additional criteria can be chosen. In an example of quantizing using two passes through the image, a coefficient is quantized with a smaller bin if it is surrounded by zeros rather than if it is surrounded by nonzero coefficients. In this case, a Haar wavelet coefficient is, for example, set to zero if the preceding coefficient in the scanning order is also below that threshold T and if the two neighboring coefficients have different signs.

After performing the thresholding, an inverse Haar transform is performed. By doing this, a denoising via wavelet shrinkage using a one- or M-level Haar wavelet transform is performed on each sample or coefficient that is computed during the reconstruction of the entire image. A schematic overview is given in FIG. 1A. The processing logic performing the operations shown in FIG. 1A may comprise hardware (e.g., dedicated logic, circuitry, etc.), software (such as run on a general purpose computer system or a dedicated machine), or a combination of both.

Referring to FIG. 1A, processing logic applies an inverse JPEG 2000 discrete wavelet transform (DWT) to LL coefficients at level L (signal 101) and high pass coefficients signal 102 at level L to produce noisy samples at level L−1 (signal 103). This DWT is also referred to herein as the compression wavelet transform. Processing logic then performs wavelet sharpening and smoothing on these samples (processing block 110). In one embodiment, the wavelet sharpening and smoothing and denoising (processing block 110) comprises processing logic applying a m-level forward Haar transform (where m equals, for example, 1, 2, 3, 4, etc.) (processing block 104), followed by thresholding of the coefficients (processing block 105). This wavelet transform is also referred to herein as the enhancement wavelet transform. Thereafter, processing logic applies a m-level inverse Haar transform (processing block 106) to the samples. The results of applying the wavelet sharpening and smoothing (processing block 110) are the generation of denoised samples at level L−1 (signal 107).

Processing logic applies an inverse JPEG 2000 DWT to the denoised samples at level L−1 (LL coefficients) (signal 107) and the high pass coefficients at level L−1 with quantization noise (processing block 108) to generate noisy samples at level L−2 (processing block 109). Processing logic applies the wavelet sharpening and smoothing (processing block 110) on each successive level of noisy samples to generate more denoised samples at a lower level and the processing repeats until denoised image samples at level 1 (processing block 111) are generated.

Then processing logic applies an inverse JPEG 2000 DWT to the denoised samples at level 1 (LL coefficients at level 1) (processing block 111) and the high pass coefficients at level 1 (processing block 112) to generate noisy samples at level 0 (processing block 113). Thereafter, wavelet sharpening and smoothing 110 is applied again to the noisy samples to produce the denoised samples at level 0 (processing block 114), which is the denoised image.

Note that in alternate embodiments, the wavelet sharpening and smoothing is only applied to a subset of all the samples or only on certain levels. For example, in one embodiment, the wavelet sharpening and smoothing is only performed on the noisy samples at level 0. For example, enhancement may only be performed over a range of levels L to L*>1 (e.g., level 5 to 3, 4 to 2, 5 to 1, etc.) for a particular monitor or display or selected levels $L_1$, $L_2$, $L_3$, (e.g., 5, 3, 2).

Depending on the amount of compression and the size of quantization bins, it might be useful sometimes to use several levels of a redundant Haar transform for the denoising procedure.

Figure 1B:
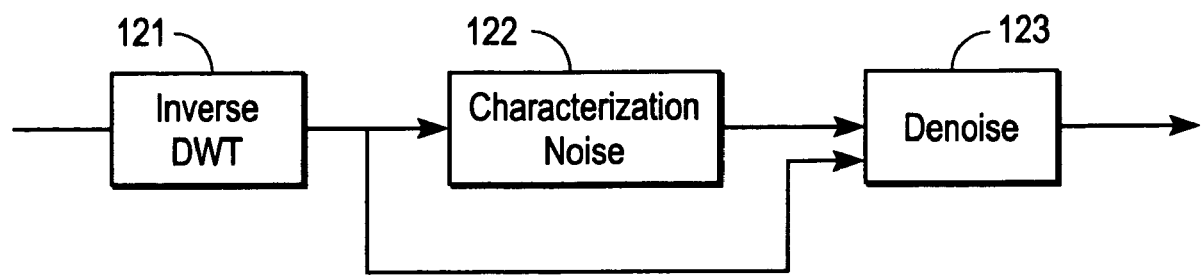
FIG. 1B is a block diagram of one embodiment of a decoder.

FIG. 1B is a block diagram of one embodiment of a decoder. Referring to FIG. 1B, an inverse discrete wavelet transform is coupled to receive image data and apply an inverse discrete wavelet transform filter to the image data. The output of inverse wavelet transform 121 is coupled to inputs of characterization block 122 and denoising block 123. Characterization noise block 122 characterizes the quantization noise in reconstructed data generated by the application of the inverse wavelet transform 121. The output of characterization noise block 122 is coupled to the input of denoising block 123. Denoising block 123 removes the quantization noise from the reconstructed data that is constructed during decoding.

Deblurring With "Embedded WSS Processing" Using the Compressed Data Stream

As previously discussed above, the WSS-technology provides a solution to the classical restoration problem that involves solving a noise removal and a deblurring problem. A second operation similar to the WSS technology may be used to also perform the inversion of a blurring on the compressed coefficients.

After the thresholding of coefficients of the 1-level (M-level) redundant Haar transform performed on the samples at level 1, the nonzero coefficients at level m are rescaled. In one embodiment, the rescaling comprises multiplying the non zero coefficients at level m by $R^{1/l} \cdot 2^{m\alpha}$, where m=1 ... M, where α is the parameter that determines the degree of smoothing (α>0) or sharpening (α<0) and R is the renormalization constant that preserves the norm of the image. Since the quantization noise is removed already, only the "true" parts of the image are enhanced by the reweighting. Since this version of WSS operates directly on wavelet coefficients (of a different transform) during the inverse transform, it is referred to herein as "embedded WSS". The parameter R and α can be determined following the rules in U.S. patent application Ser. No. 09/467,544, entitled "Multiscale Sharpening and Smoothing With Wavelets," filed Dec. 10, 1999 and U.S. patent application Ser. No. 09/658,393, entitled "Wavelet-Based Image Processing Path," filed Sep. 8, 2000 based on theoretical smoothing characteristics of a sensor and modeling of an image in Besov spaces. However, it is also possible to derive estimates for α and R directly from experimental studies of devices such as CCDs and a series of test images.

Range for Sharpening or Smoothing Parameter α Dependent on Smoothness of the Wavelet System γ

In one embodiment, sharpening and smoothing is expressed by rescaling wavelet coefficients by multiplication with the factor $R^{1/l} \cdot 2^{m\alpha}$, where α is the sharpening/smoothing parameter and R a renormalization factor. The range of possible values for α is bounded by the smoothness of the wavelet system γ and the smoothness of the signal. If the signal has Hoelder regularity β then α has to satisfy the condition 0<β+α<γ, i.e. $\alpha \in (-\beta, \gamma-\beta)$.

For overcomplete wavelet transforms using orthogonal wavelets, the regularity γ is approximately the smoothness of the autocorrelation function of the wavelet function. As a consequence, the overcomplete Haar system has γ=1. For the overcomplete biorthogonal 5-3 system, a similar value for γ has performed well in the experiments.

A scanned document typically has a smoothness β>1. Therefore, α is set as α=−1 for the application of the enhancement of a scanned document.

Figure 2:
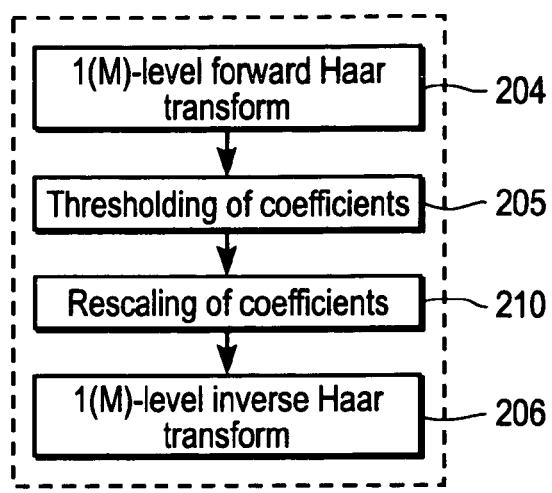
FIG. 2 is a flow diagram of one embodiment of a wavelet sharpening and smoothing process.

Embedded WSS can be demonstrated in a similar schematic overview as the noise removal in FIG. 1 by substituting the dashed Haar-transform block by the following block that includes an additional rescaling of coefficients for the deblurring. This is shown in FIG. 2. Note that although the use of the Haar transform is described herein, other transforms may be used for the same purpose, such as, for example, the 2,6 or 5,3 transforms (as well as others) may be used.

Referring to FIG. 2, the wavelet sharpening and smoothing includes processing logic applying a 1- or (m)-level forward Haar transform (processing block 204), followed by thresholding of coefficients (processing block 205). Thereafter, processing logic applies rescaling of coefficients (processing block 210). After rescaling of coefficients, processing logic applies a 1- or m-level inverse Haar transform (processing block 206). In one embodiment, m equals 1, but it may be other numbers as described above.

By performing nonlinear shrinkage combined with resealing, the embedded WSS is not equivalent to any spatial domain linear filter or Fourier-based technique. Moreover, it operates in a noniterative manner which makes it easy to implement hardware or software.

The techniques presented herein, the quantization noise removal and its combination with deblurring using the embedded WSS, operate on the quantized coefficients and are decoder options. The enhancement of LL samples successively during the reconstruction process makes it possible in network applications, for example, to adapt the enhancement process of the image to a special resolution, such as, for example, for the display on a monitor.

Method of Determining Quantization at the JPEG 2000 Encoder Using WSS Information The discussion above provided a way to reduce artifacts and enhance images after compression by a generic JPEG 2000 encoder. The discussion below provides a technique for reducing artifacts and enhancing images with a special purpose encoder which will work with a generic JPEG 2000 decoder (e.g., JPEG 2000 decoder, a JPEG 2000 decoder without any noise removal or sharpening, etc.).

Preprocessing with WSS

Figure 3:
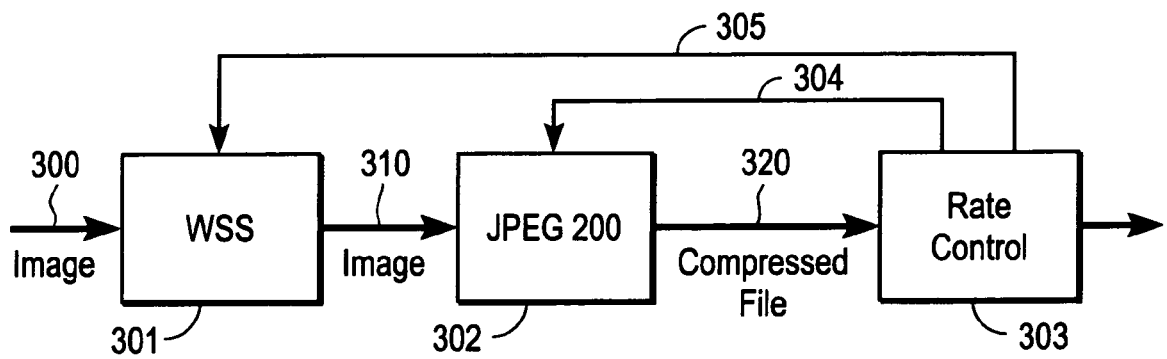
FIG. 3 is a block diagram of one embodiment of an encoder.

One way to combine WSS technology with JPEG 2000 is to run wavelet smoothing and sharpening on the image before compression as shown in FIG. 3. Referring to FIG. 3, an image 300 is input into wavelet sharpening and smoothing (WSS) processing block 301. In one embodiment, block 301 is equivalent to FIG. 2. This performs sharpening or smoothing and deblurring. The output of WSS processing block 301 is image 310. Image 310 is input in JPEG 2000 encoder 302, which performs JPEG 2000 encoding, to generate compressed file 320. Rate control processing block 303 monitors compressed file 320 and feeds back in one or more feedbacks, such as, for instance, feedback 304 and feedback 305. Feedback 304 is used by JPEG 2000 encoder 302 to control the JPEG 2000 encoder 302 to quantize more or less information depending on whether the rate at which data is being output in compressed file 320 is greater or lesser than the predetermined target rate. Similarly, the feedback 305 may cause WSS processing block 301 to perform more denoising, more sharpening, or more smoothing.

Thresholds may be used for preprocessing in the encoder, perhaps as indications of texture, and may be determined in one of the following ways:

1. Standard deviation or median of absolute values of coefficients in one region (e.g., HH coefficients at level 1) (global threshold)
2. Standard deviation or median of absolute values of HH coefficients at each level (level-dependent threshold)
3. Standard deviation or median of absolute values of LH/HL/HH coefficients at first level (band-dependent threshold). For the example of two levels of decomposition three thresholds are chosen.
4. Standard deviation or median of absolute values of LH/HL/HH coefficients at each level (level-band-dependent threshold). For the example of two levels of decomposition, six thresholds are chosen.
5. Manually set thresholds (global, level-dependent, level-band dependent) using controls that are part of the user interface of the device.
6. Local thresholding by computing local variances or medians of coefficients within a subband.
7. Using a classifier different thresholds can be set for each class determined by the classifier. As discussed above these thresholds can be determined globally, in a level-dependent method, or in a level and band dependent method.

The smoothing operation of WSS eliminates some coefficients that are considered to be "noise" and allows the compression system to spend fewer bits encoding the image. The sharpening operation of WSS increases some coefficients. Increasing the coefficients increases the bit rate required by the encoder, but in some cases eliminates the perception that the compressed image is too "smoothed" (a common complaint in wavelet compression systems).

The separated WSS and JPEG 2000 compression allows different wavelet transforms to be used for enhancement and compression. In one embodiment, the over complete Haar wavelet transforms can be used for WSS, while JPEG 2000 can use the critically sampled 5-3 or 9-7 wavelet transforms. In addition, even though WSS is separate from the compression system, it could be used inside a rate control loop. For example, if after the first denoising and compression of an image the bitrate is too high, rather than increasing the quantization done by the compression system, the smoothing done by the WSS system could be increased.

Integrated WSS and JPEG 2000

Typically, wavelet denoising techniques work by reducing the magnitude of wavelet coefficients in order to suppress noise. In one embodiment, the denoising operation of WSS determines a threshold T for each coefficient and sets the coefficient to zero if it is smaller than the threshold.

There is a relationship between the Q in quantization of a compression system and the T used for thresholding in a noise removal system. If Q is set equivalent to T, then a compression system has the same effect on all coefficients less than the threshold as both soft and hard thresholding. In addition, the "compression" noise added is of the same order of magnitude as the noise being removed. If the "compression" or quantization noise is in the opposite direction of the real noise, it cancels the real noise producing a better image; if it is in the same direction, it adds to the real noise and quantization noise.

Thus, the simplest system, conceptually, is to run any denoising system to determine a set of thresholds to use for each subband, and then to use those values for quantization parameters (normalized to adjust for differences in wavelet bases) for the compression system. Normalization is explained in more detail below. Such a system is shown in FIG. 4.

Figure 4:
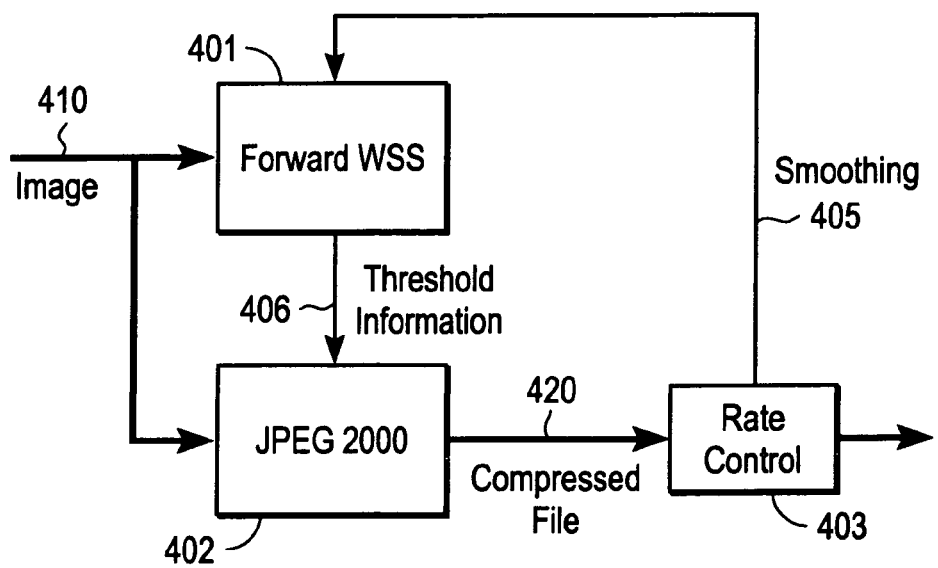
FIG. 4 is a block diagram of an alternative embodiment of an encoder.

Referring to FIG. 4, image 410 is input into WSS processing block 401 and JPEG 2000 encoder 402. Forward WSS processing block 401 generates quantization parameters in the form of threshold information 406 to input into the JPEG 2000 encoder 402. JPEG 2000 encoder 402 performs encoding, including performing quantization based on threshold information 406, and generates compressed file 420 to rate control block 403. Rate control block 403 performs rate control by monitoring how many bits are being generated in compressed file 420 and comparing that to a predetermined target rate. Rate control 403 generates feedback 405 to forward WSS processing block 401 to control the amount of smoothing that is performed as a way to control the quantization performed by JPEG 2000 encoder 402. In this manner, the rate may be controlled. Rate control could operate in a feed-forward manner only on a sequence of images. The rate might also be controlled for regions smaller than an entire image. Also in many cases, it is not necessary to rerun the compression system to use a smaller threshold, sometimes compressed data may be discarded.

In this case, WSS again can use a different wavelet system than JPEG 2000, but the entire WSS system is not required. Only the forward transform is needed, and depending on the method to determine the thresholds, the buffer memory for denoising may be vastly reduced.

If reversible filters are used in JPEG 2000, then the quantization value is also changed to the nearest power of two. Of course, computational performance is better if the wavelet denoising system is using the same wavelet transform as the compression system.

If the denoising system determines different thresholds for different coefficients within a subband (e.g., WSS with text vs. non-text distinction), then different quantizations can be applied on each code-block in JPEG 2000. If the denoising system provides different thresholds for regions smaller than a code-block, then, in one embodiment, the thresholds are combined to produce one threshold for the code-block. In one embodiment, this combination could be a simple average. In alternative embodiments, this combination may use the minimum threshold determined for the whole block or some value in between. The wavelet sharpening and smoothing unit or the JPEG 2000 compressor does the combining of thresholds.

Alternatively, some coefficients with very large thresholds may be eliminated while leaving other coefficients. In still another embodiment, coefficients may be quantized more coarsely even though the over all quantization is fine grained. In these cases, the ability to produce a more refined image beyond the current quantization is lost, but that may be acceptable in noise reduction applications.

There could be many methods. For example, suppose the Haar threshold for denoising is T, the change in a coefficient by T has the effect $\alpha T$ on the MSE of an image, and suppose in the compression system error of Q in same subband causes $\beta Q$ MSE on the image, then use $$Q = \frac{\alpha T}{\beta}.$$

The thresholds from a wavelet denoising system may also be applied as weights for a Rate Distortion (R-D) optimization algorithm (like the JPEG 2000 Verification Model (VM)) or described in David Taubman, "High Performance Scalable Image Compression with EBCOT," IEEE Trans IP, Vol. 9, no. 7, July 2000.

If the denoising system is using the same wavelet transform as the compression system (and is using a critically sampled wavelet, e.g., not a redundant wavelet), then the denoising operation and compression system do not need to operate independently and substantial computation can be saved. One embodiment of such a system is shown in FIG. 5.

Figure 5:
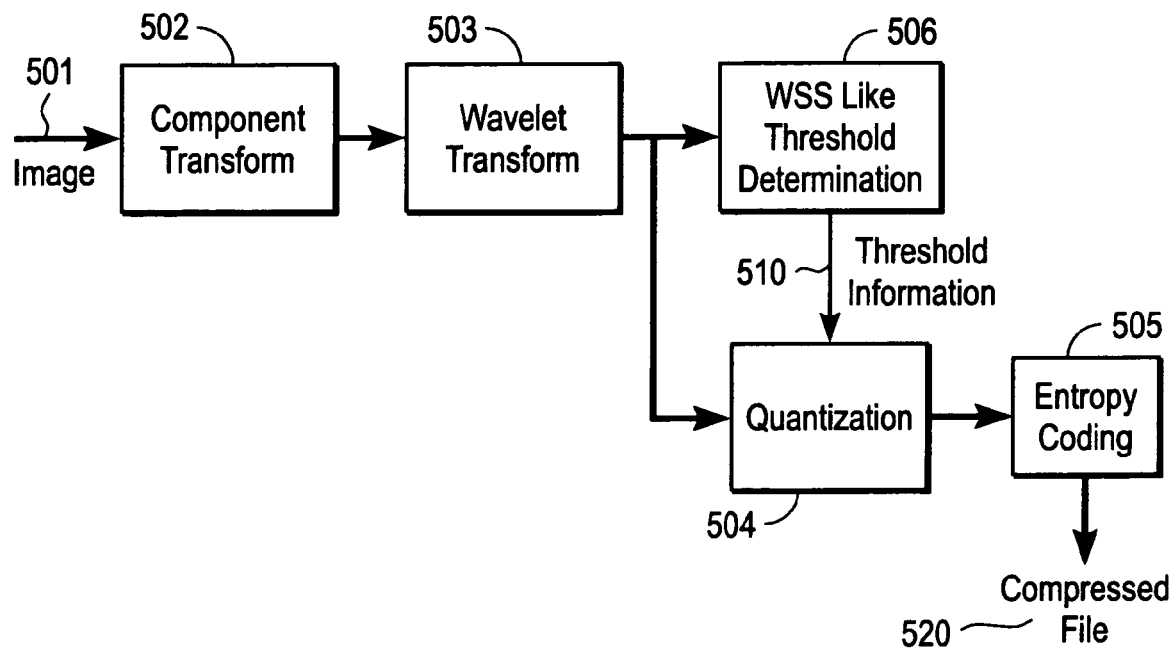
FIG. 5 is a block diagram of an alternative embodiment of an encoder.

Referring to FIG. 5, an image 501 is input into component transform 502 which decorrelates red, green, and blue components into Y, Cb, Cr. The output of component transform 502 is input in wavelet transform 503, which performs a wavelet transform. The coefficients that are output of wavelet transform 503 are input into WSS threshold determination processing block 506 and quantization processing block 504. The WSS-like threshold determination processing block 506 generates threshold information 510 in response to inputs from the wavelet transform processing block 503 and inputs threshold information 510 into quantization block 504. In response to threshold information 510, quantization processing block 504 performs quantization. The output of quantization processing block 504 is a quantized compressed image. The quantized compressed image is input to entropy coding 505 to create compressed file 520.

Information from the WSS system may be used to decide if coefficients close to a quantization threshold should be increased or decreased.

EXAMPLES

Example of Using Denoising with Decoding

Figure 6:
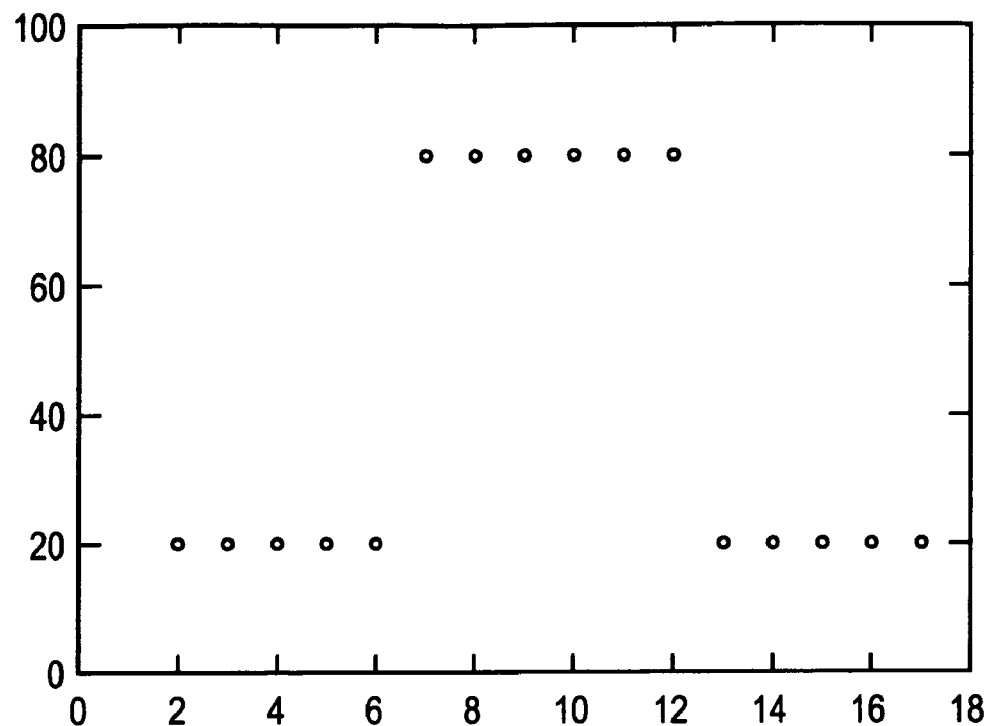
FIG. 6 illustrates an input signal with step edges.

The following simple example shows how wavelet denoising can improve lossy decompression of signals with smooth regions and edges. Source code and numerical results are provided below. The example processes a one-dimensional (1D) signal for simplicity. FIG. 6 illustrates an input signal with step edges.

Figure 7:
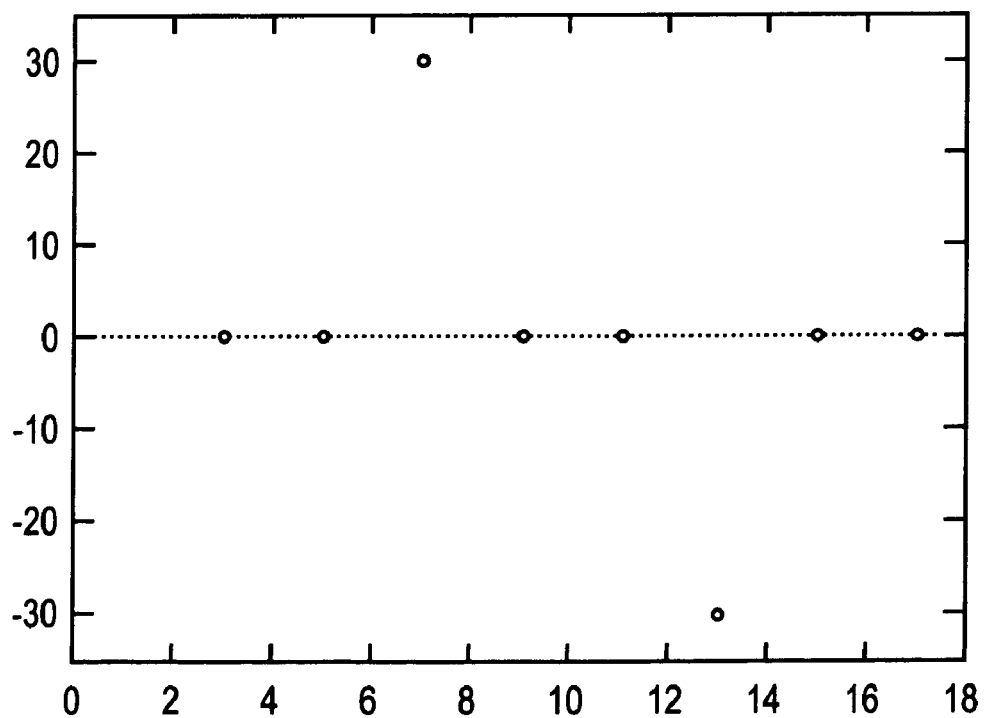
FIG. 7 shows the high pass coefficients for a 5-3 transform assuming a mirror extension at boundaries.
Figure 8:
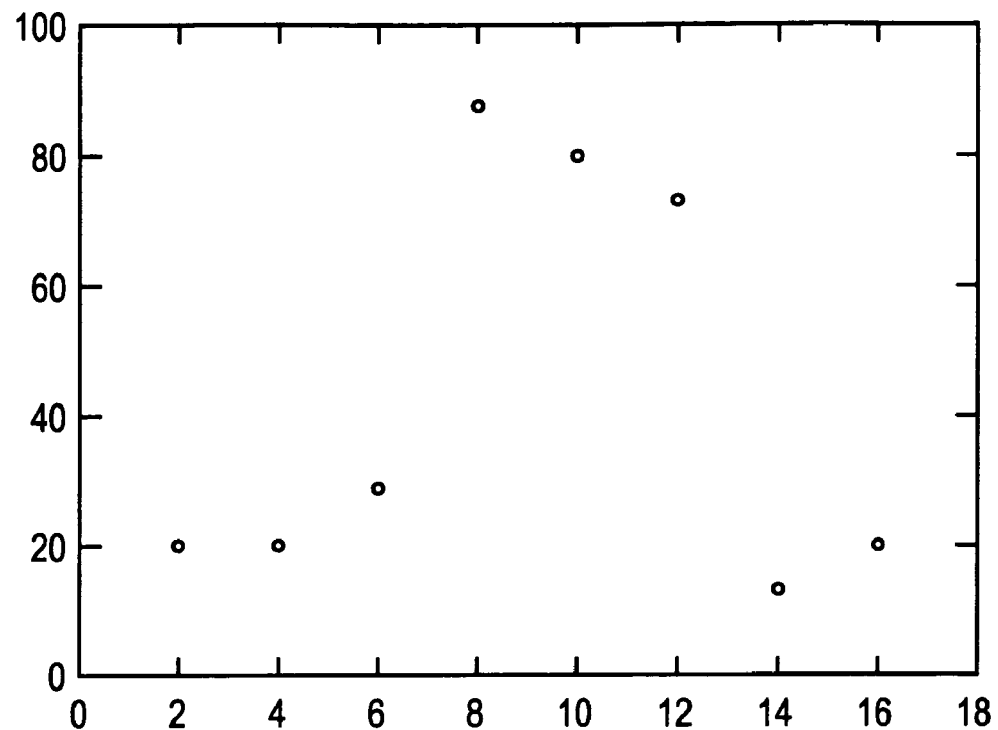
FIG. 8 shows the low pass coefficients for a 5-3 transform assuming the use of mirror extension at boundaries.

FIG. 7 shows the high pass coefficients for a 5-3 transform assuming a mirror extension at boundaries. FIG. 8 shows the low pass coefficients for a 5-3 transform assuming the use of mirror extension at boundaries.

Figure 9:
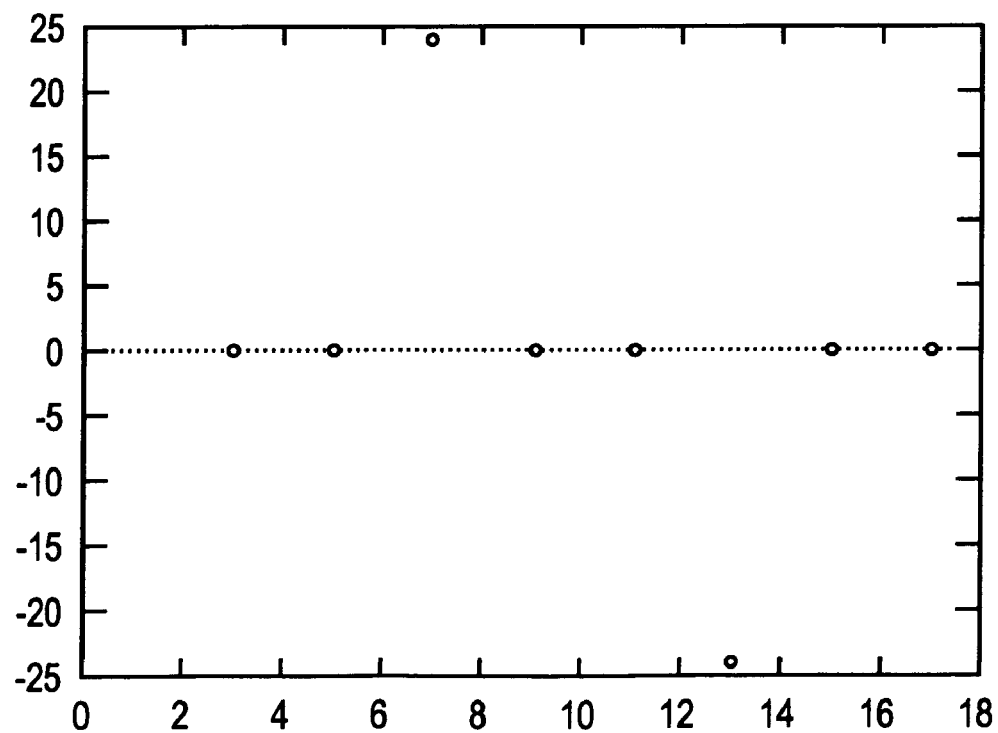
FIG. 9 shows the high pass coefficients being quantized with Q equal to 16.

FIG. 9 shows the high pass coefficients being quantized with Q equal to 16. In such a case, 30 is quantized to 16+8=24 and −30 is quantized to −24.

Figure 10:
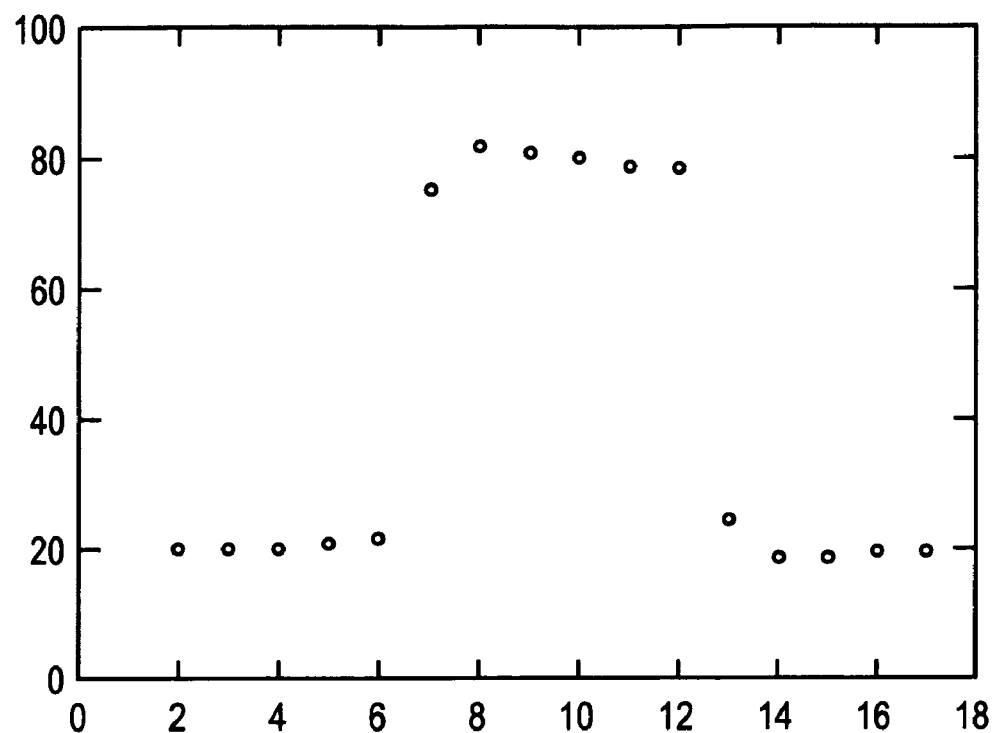
FIG. 10 shows the result of applying the inverse transform.

Once the high pass coefficients have been quantized, an inverse transform is applied. FIG. 10 shows the result of applying the inverse transform. In this example, the result has a mean squared error (MSE) 3.44 difference with the input signal.

Figure 11:
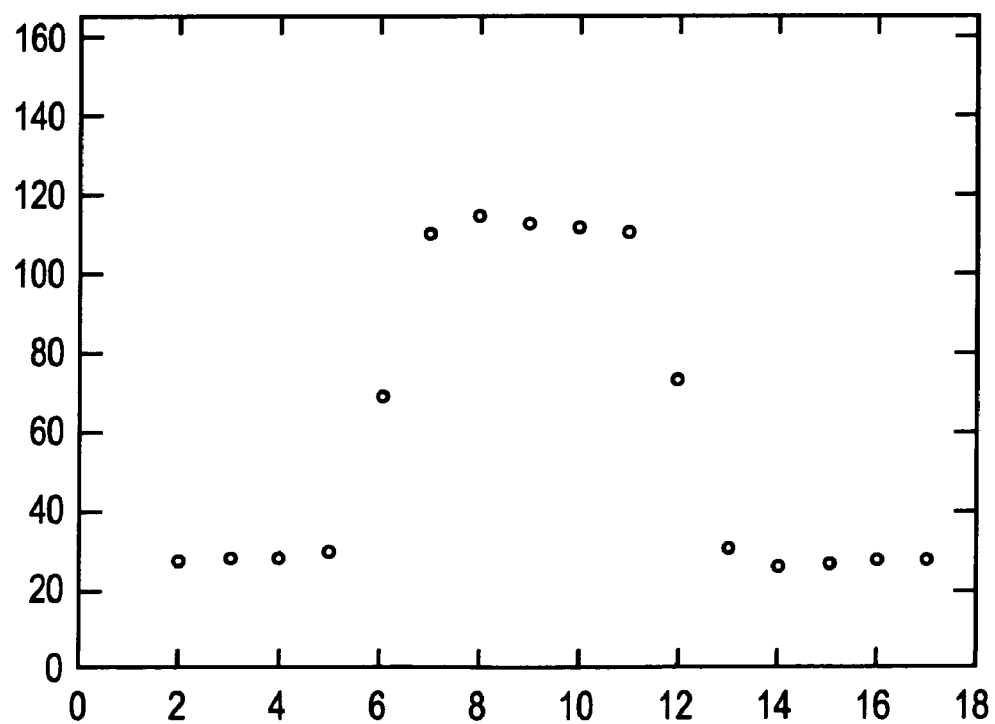
FIG. 11 illustrates the Level 1 low pass filter result of applying of the redundant Haar transform.
Figure 12:
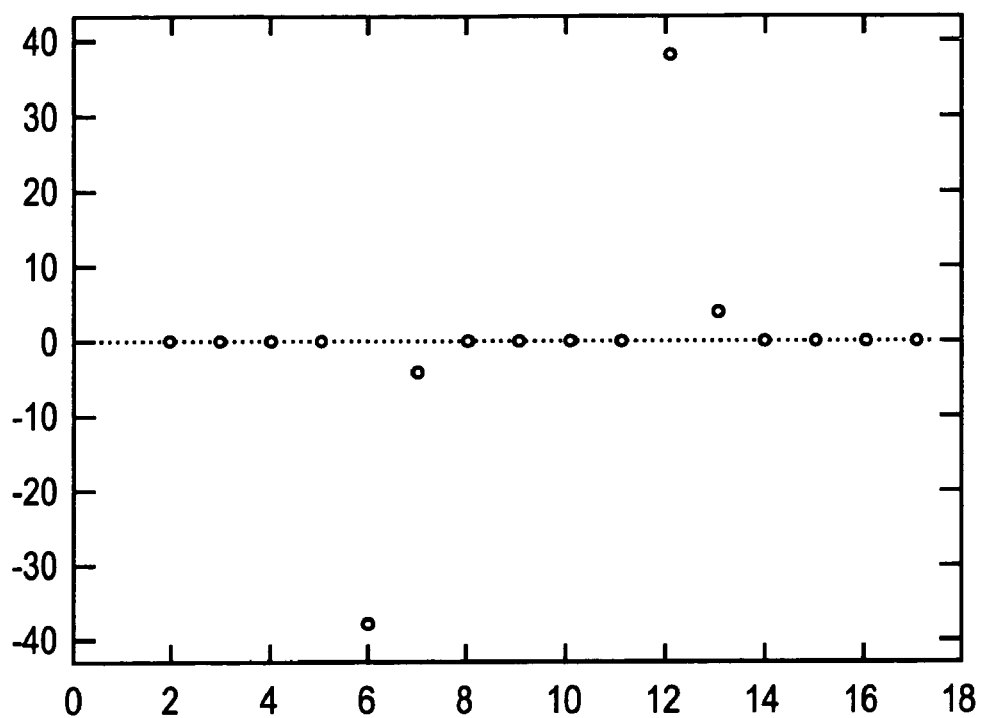
FIG. 12 shows the Level 1 high pass filter result of applying of the redundant Haar transform.
Figure 13:
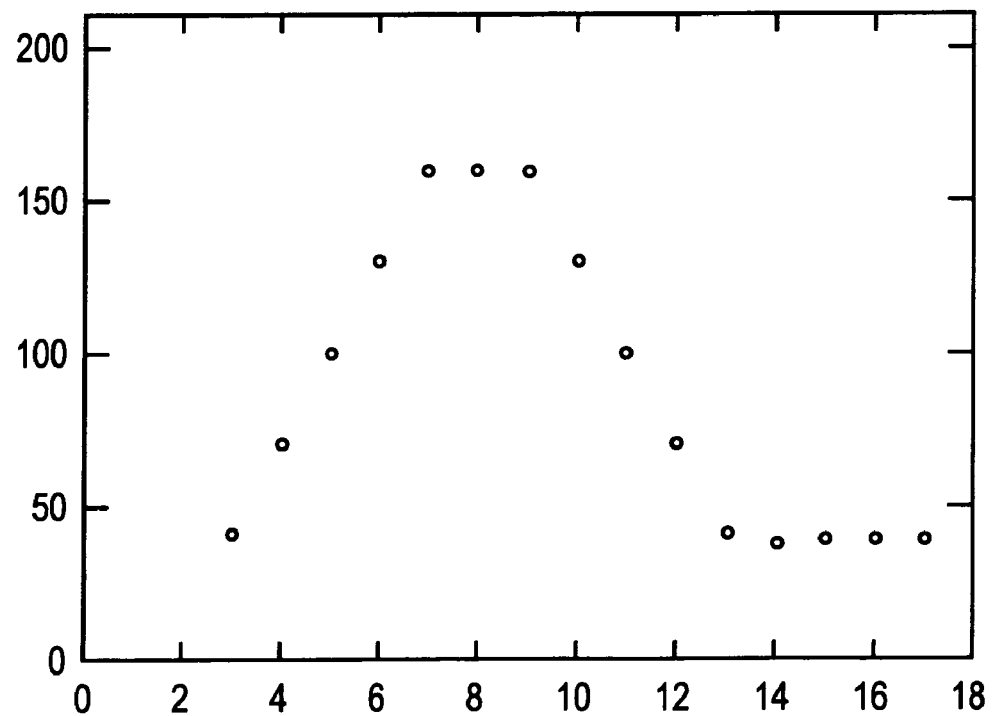
FIG. 13 shows the Level 2 low pass filter result of applying of the redundant Haar transform.
Figure 14:
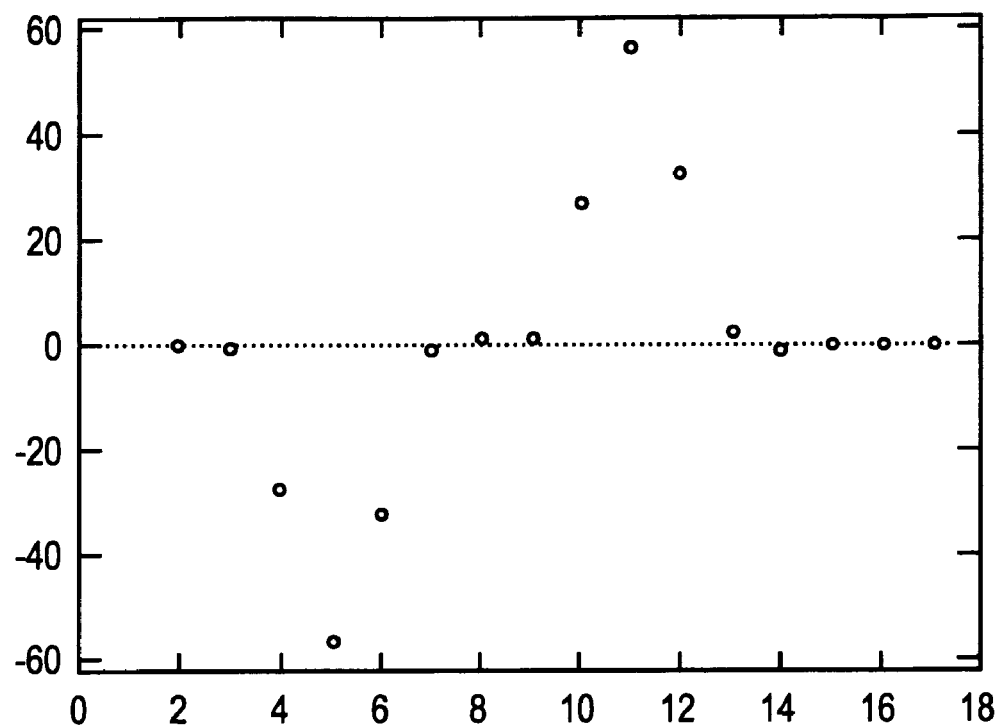
FIG. 14 shows the Level 2 high pass filter result of applying of the redundant Haar transform.

Thereafter, the redundant Haar transform is applied. FIG. 11 illustrates the Level 1 low pass filter result of applying of the redundant Haar transform. FIG. 12 shows the Level 1 high pass filter result of applying of the redundant Haar transform. FIG. 13 shows the Level 2 low pass filter result of applying of the redundant Haar transform. FIG. 14 shows the Level 2 high pass filter result of applying of the redundant Haar transform.

Then denoising is performed by setting small coefficients to 0. In this example, Q is 16. Following Table 7, a threshold $$\frac{16}{\sqrt{2}} \cong 11.$$

Figure 15:
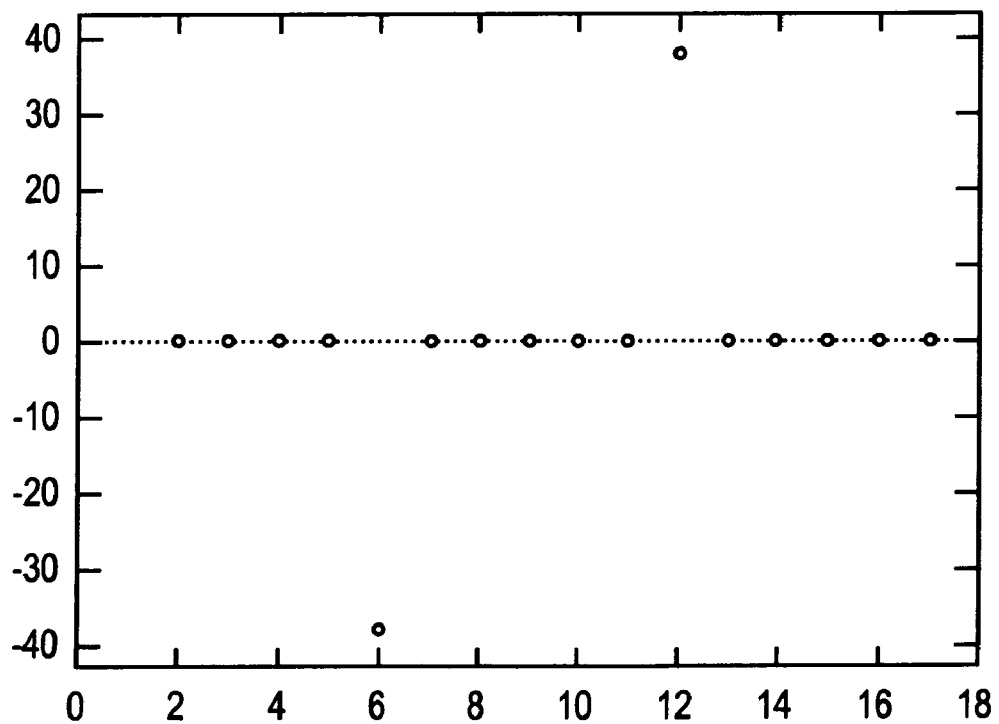
FIG. 15 shows the denoised high pass coefficients for level 1.

FIG. 15 shows the denoised high pass coefficients for level 1.

For this example, a sharpening parameter $\alpha=-\frac{1}{2}$ is chosen. Sharpening with the redundant Haar wavelet varies from $\alpha=0$ for no sharpening to $\alpha=-\gamma=-1$ for maximum sharpening. Therefore, this is half of the maximum sharping. The number of transform levels, L, equals 2 for this example. The renormalization parameter R is 1.825 from:

$$\sqrt{\frac{\left(\frac{2^{(L+1)2\gamma} - 2^{2\gamma}}{2^{2\gamma}-1}\right)}{\left(\frac{2^{(L+1)2(\gamma+\alpha)} - 2^{2(\gamma+\alpha)}}{2^{2(\gamma+\alpha)-1}}\right)}} = \sqrt{\frac{\left(\frac{2^{3\cdot 2\cdot 1} - 2^{2\cdot 1}}{2^{2\cdot 1}-1}\right)}{\left(\frac{2^{3\cdot 2\cdot(1-\frac{1}{2})} - 2^{2\cdot(1-\frac{1}{2})}}{2^{2\cdot(1-\frac{1}{2})}-1}\right)}} =$$

-continued $$\sqrt{\frac{\left(\frac{64-4}{4-1}\right)}{\left(\frac{8-2}{2-1}\right)}}$$

Figure 16:
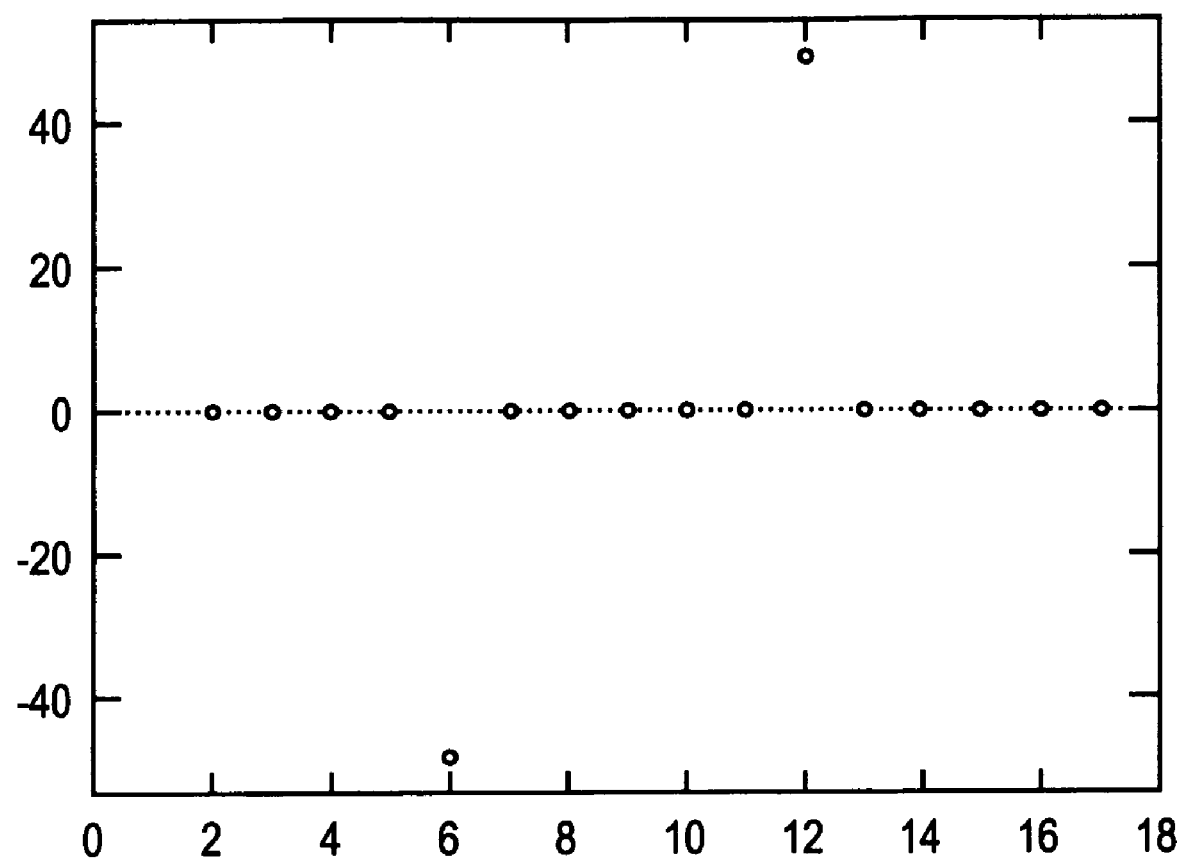
FIG. 16 shows the denoised and sharpened high pass coefficients for level 1.
Figure 17:
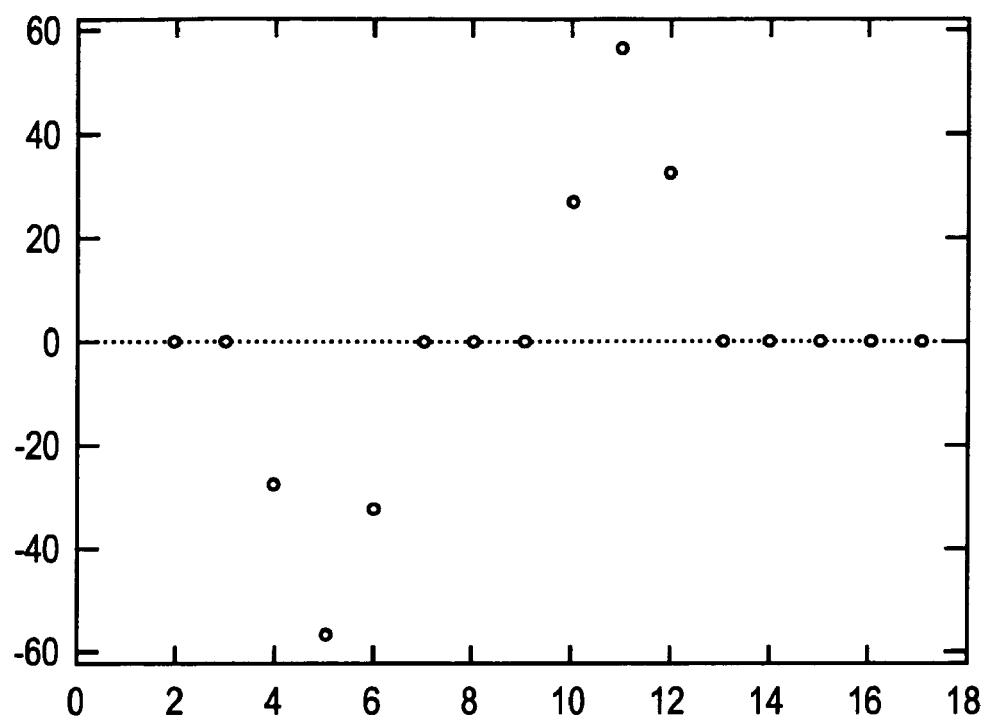
FIG. 17 shows the denoised high pass coefficients for level 2.
Figure 18:
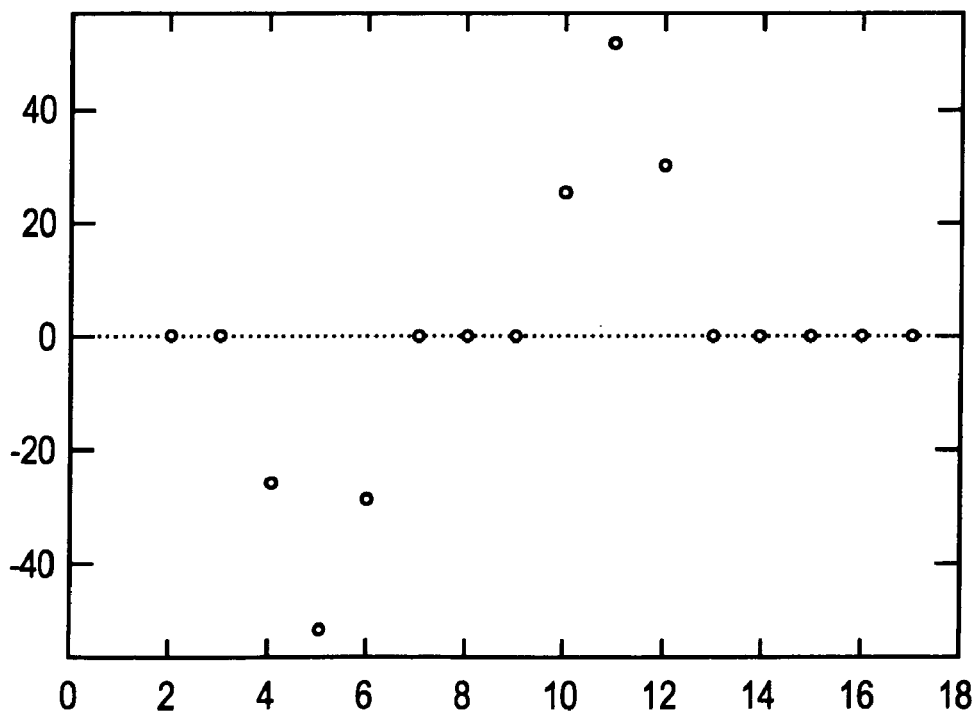
FIG. 18 shows the denoised and sharpened high pass coefficients for level 2.

For level 1, the sharpening multiplier $\mu_1=R\cdot 2^\alpha$ is $1.825\cdot 2^{-1/2}=1.29$. For level 2, the sharpening multiplier $\mu_2=R\cdot 2^{\alpha\cdot 2}$ is $1.825\cdot 2^{-1/2\cdot 2}=0.913$. FIG. 16 shows the denoised and sharpened high pass coefficients for level 1. FIG. 17 shows the denoised high pass coefficients for level 2. FIG. 18 shows the denoised and sharpened high pass coefficients for level 2.

Figure 19:
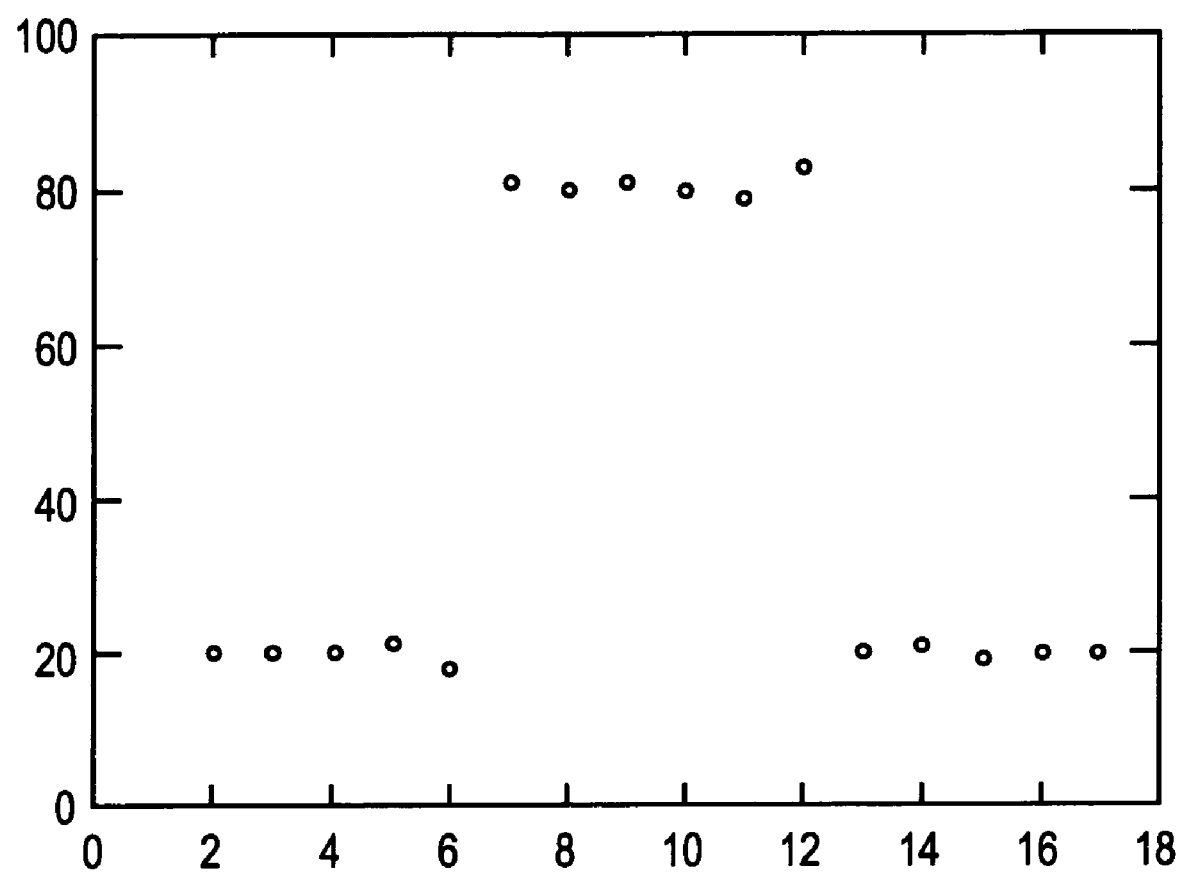
FIG. 19 shows the result of applying a two level inverse redundant Haar transform to the low pass coefficients and the denoised high pass coefficients.

FIG. 19 shows the result of applying a two level inverse redundant Haar transform to the low pass coefficients and the denoised high pass coefficients. This result has an MSE 1.19 difference with the original signal so the result is closer to the original signal than the reconstruction without denoising and sharpening. The sharpening does compensate for blurring caused by lossy wavelet compression. Only denoising (no sharpening) results in a MSE of 1.75 which is not as close to the original as the result with sharpening. (In general, MSE is not always an appropriate measure for a good reconstruction, but it is commonly used and appropriate for this simple example.) The step edges are more uniform than the result before denoising.

Example of Using WSS Pre-Processing Before Encoding

For some applications, it is desirable to encode images such that edges are preserved and textures are eliminated. In some cases, textures may be undesirable noise, such as, for example, film grain noise, thermal noise in CDD or other image sensors, etc. Textures may also be caused by halftoning or dithering. In other cases, the textures are part of the original signal, but for lossy compression, accurately representing the texture results in poor compression while providing little value to an observer. Accurately representing edges often has high value to an observer.

To eliminate textures but preserve edges, wavelet denoising with multiple levels of wavelet transform can be used. A transform level other than the first level can be used to control denoising of lower transform levels. For example, all coefficients of lower levels can be set to zero if the corresponding control level coefficient is zero. Alternatively, all coefficients of lower levels can be set to zero if the corresponding control level coefficient is zero or has opposite sign. Additionally, lower level coefficients may be set to zero if they are below a threshold to combine texture removal with usual denoising.

Figure 20:
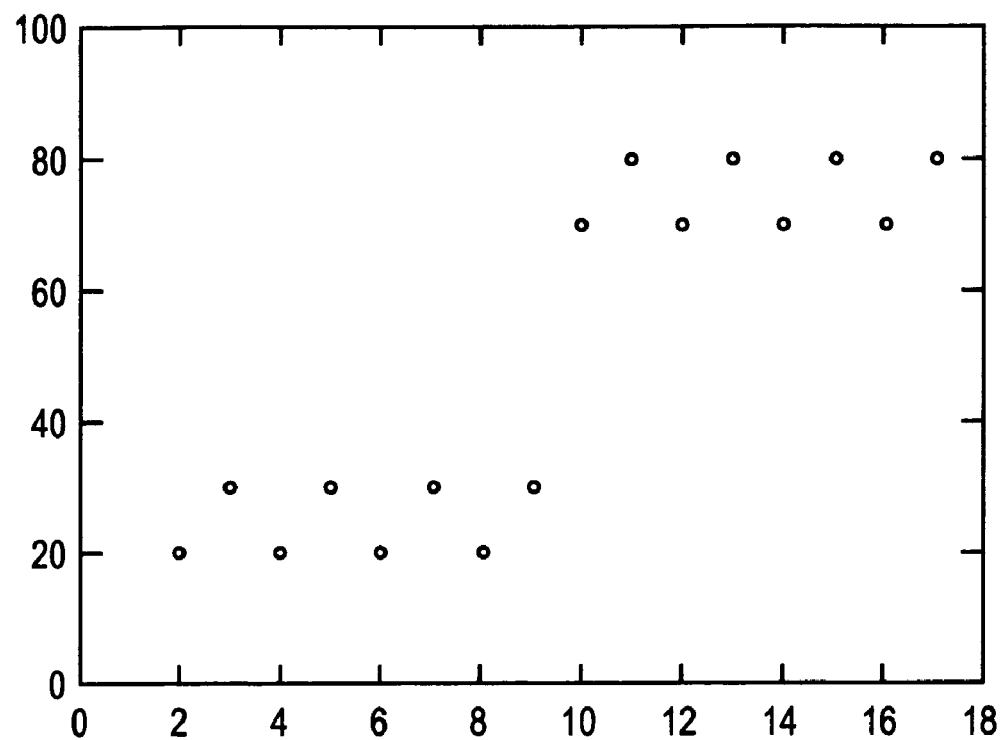
FIG. 20 shows an exemplary input signal that contains an edge between two textured regions.
Figure 21:
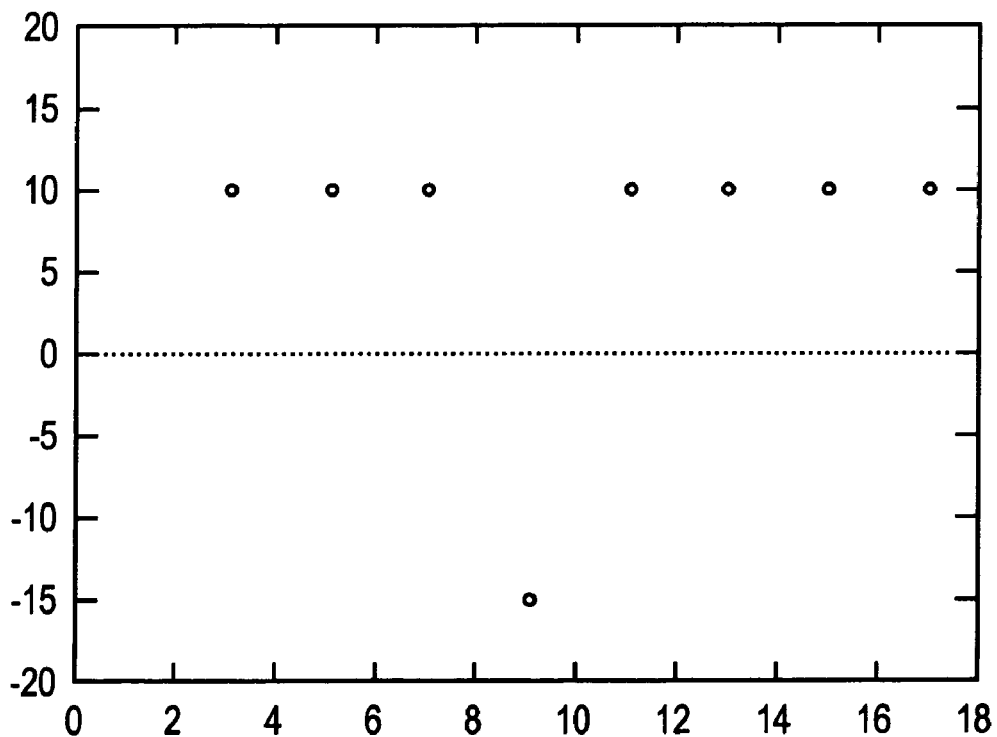
FIG. 21 shows the result of the applying high pass 5-3 filter to the input signal.
Figure 22:
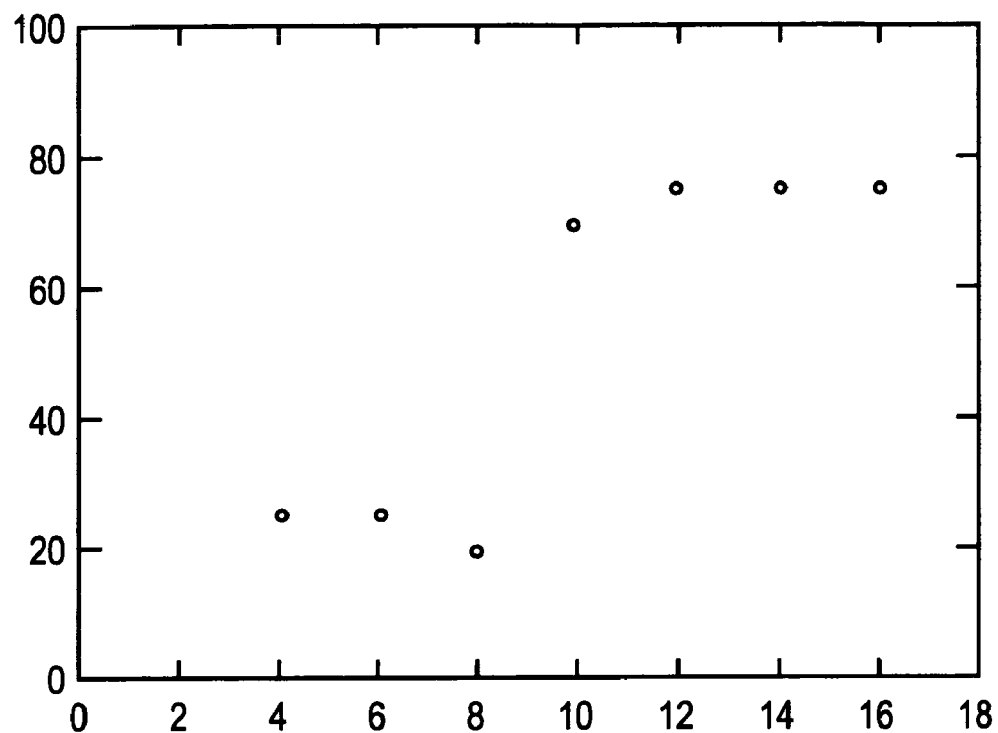
FIG. 22 shows the result of applying a low pass 5-3 filter to the input signal.

FIG. 20 shows an exemplary input signal that contains an edge between two textured regions. FIG. 21 shows the result of the applying high pass 5-3 filter to the input signal. FIG. 22 shows the result of applying a low pass 5-3 filter to the input signal.

Figure 23:
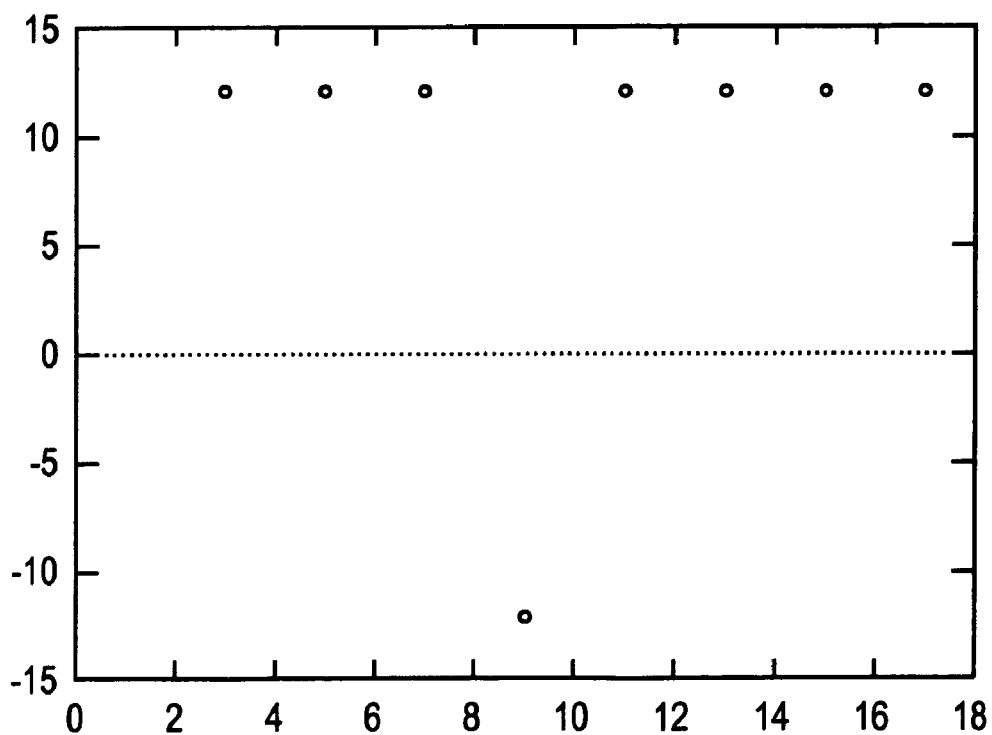
FIG. 23 shows that with quantization Q equal to 8, the high pass coefficients for the texture and the edge have the same magnitude, 12.

FIG. 23 shows that with quantization Q equal to 8, the high pass coefficients for the texture and the edge have the same magnitude, 12.

Figure 24:
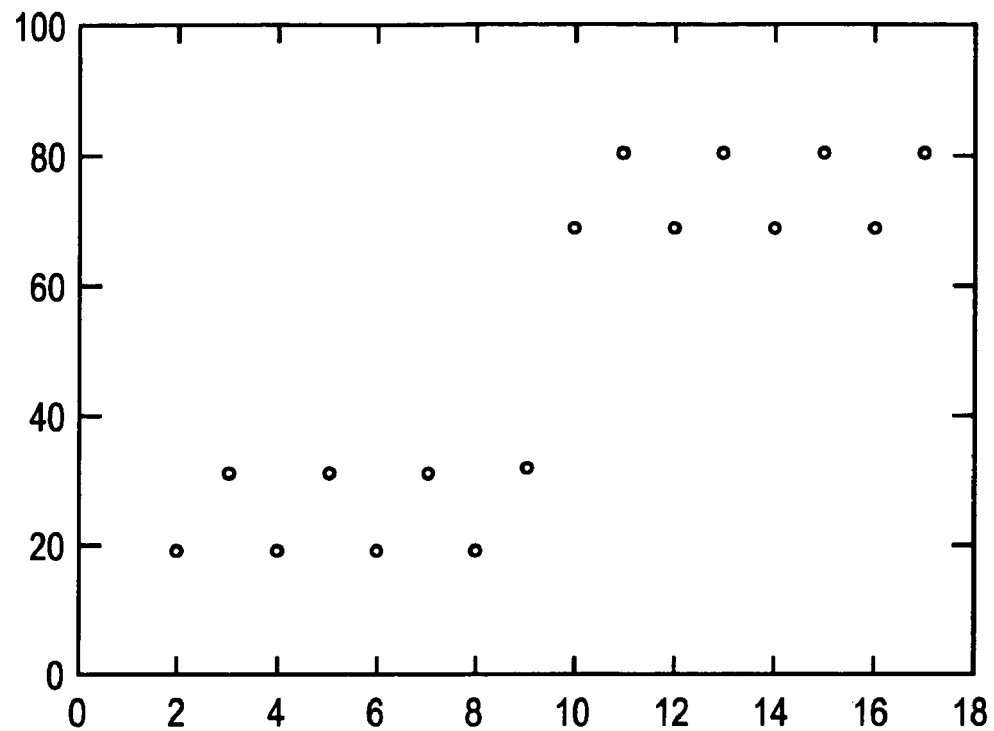
FIG. 24 shows the result of using Q equal to 8 to represent the texture and the edge if a low compression ratio is acceptable.

FIG. 24 shows the result of using Q equal to 8 to represent the texture and the edge if a low compression ratio is acceptable.

Figure 25:
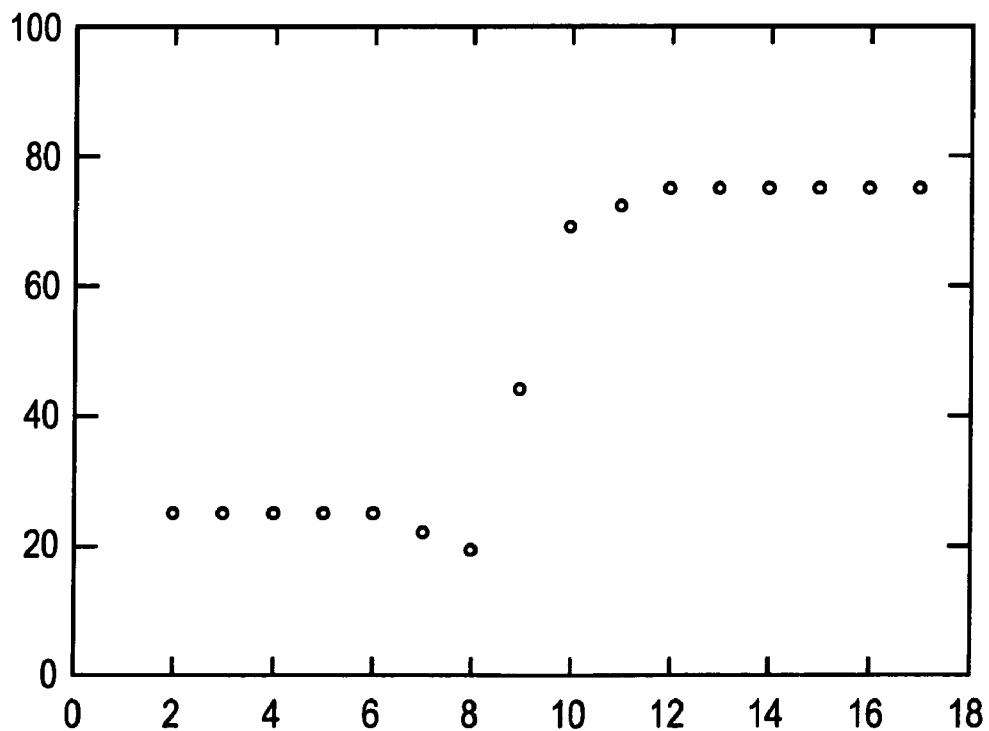
FIG. 25 shows the reconstruction in the case where quantization Q equals 16.

With quantization Q equaling 16, high pass coefficients for both the edge and texture are quantized to 0. FIG. 25 shows the reconstruction in the case where quantization Q equals 16.

Figure 26:
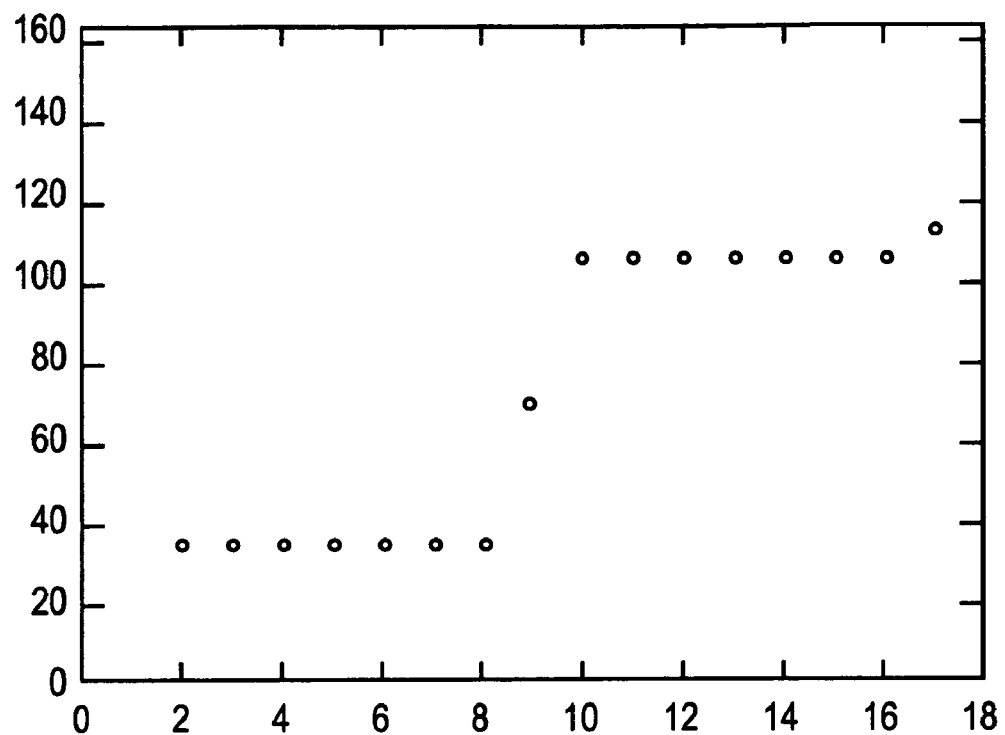
FIG. 26 shows the level 1 low pass result of applying a redundant Haar transform to the original signal.
Figure 27:
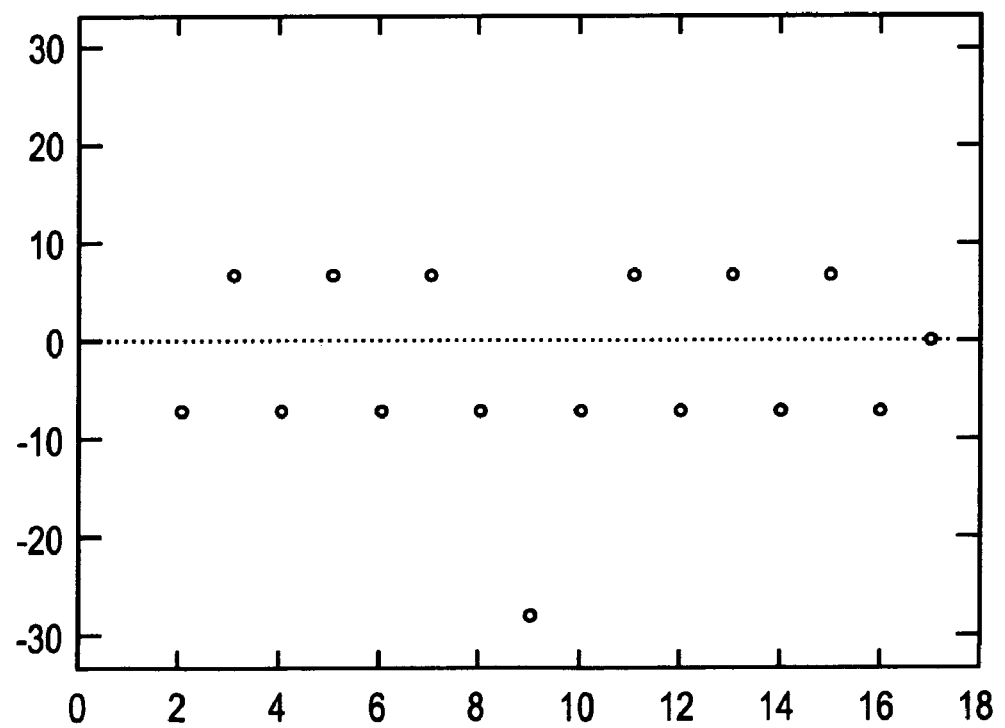
FIG. 27 shows the level 1 high pass result of applying a redundant Haar transform to the original signal.
Figure 28:
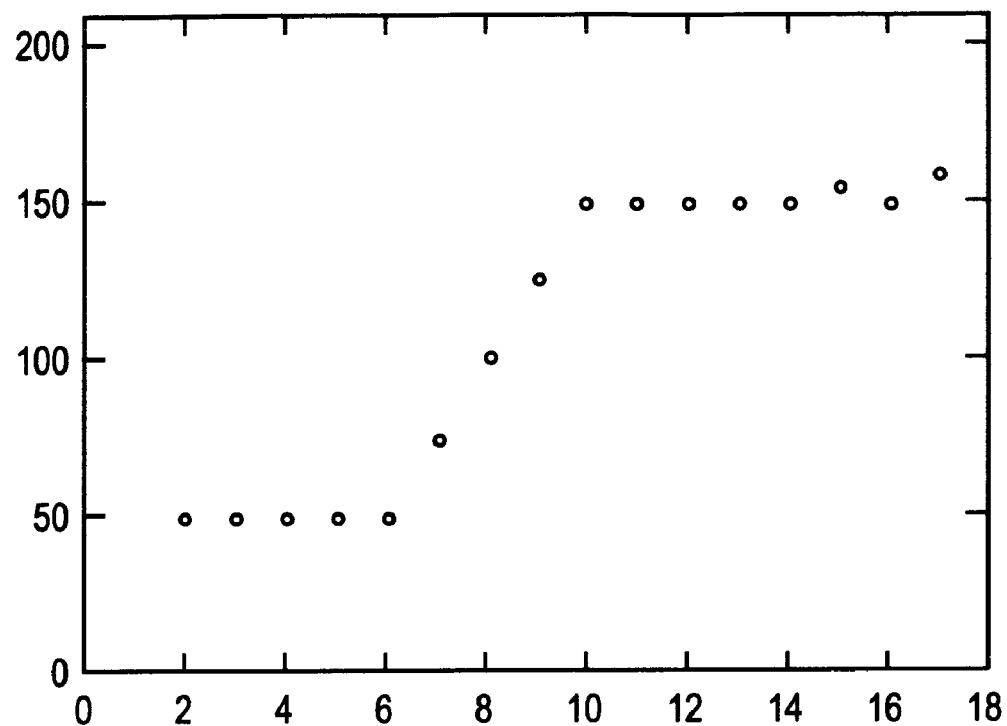
FIG. 28 shows the level 2 low pass result of applying a redundant Haar transform to the original signal.
Figure 29:
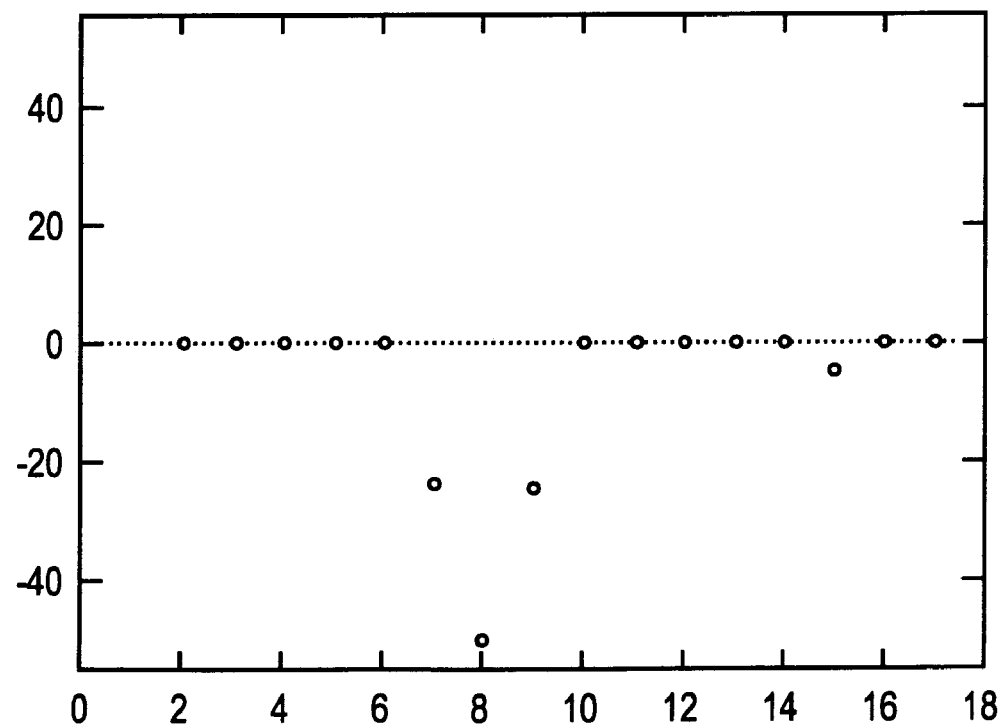
FIG. 29 shows the level 2 high pass result of applying a redundant Haar transform to the original signal.

Alternatively, WSS is applied to the original signal. FIG. 26 shows the level 1 low pass result of applying WSS to the original signal. FIG. 27 shows the level 1 high pass result of applying WSS to the original signal. FIG. 28 shows the level 2 low pass result of applying WSS to the original signal. FIG. 29 shows the level 2 high pass result of applying WSS to the original signal.

Figure 30:
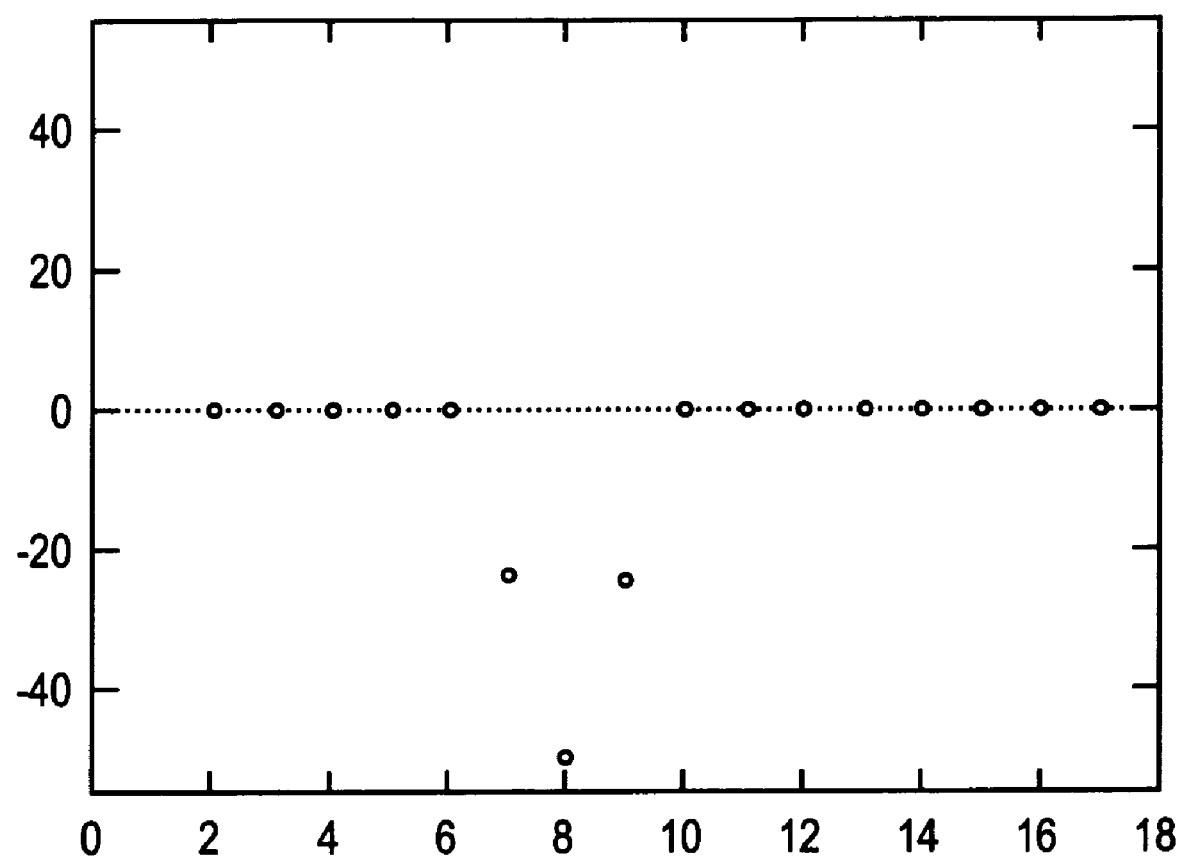
FIG. 30 shows the level 2 denoised coefficients that result from the denoising.

Denoising is applied to the high pass coefficients to keep the edge but eliminate the texture. For some applications, the threshold for level l>1 should be chosen decreasing monotonically with increasing l. For level 2, a value for Q equaling 8 and threshold $$T = \frac{8}{\sqrt{2}} \cong 6$$

are used. FIG. 30 shows the level 2 denoised coefficients that result from the denoising.

For this example, a sharpening parameter $\alpha$ equals $-1$ is chosen, which is the maximum sharpening for the redundant Haar transform which has $\gamma$ equal to 1. The number of transform levels, L, equals 2 for this example. The renormalization parameter R is 3.1623 from:

$$\sqrt{\frac{\left(\frac{2^{(L+1)2\gamma}-2^{2\gamma}}{2^{2\gamma}-1}\right)}{L}} = \sqrt{\frac{\left(\frac{2^{3\cdot 2\cdot 1}-2^{2\cdot 1}}{2^{2\cdot 1}-1}\right)}{2}} = \sqrt{\frac{\left(\frac{64-4}{4-1}\right)}{2}} = \sqrt{10}$$

For level 1, the sharpening multiplier $\mu_1=R\cdot 2^\alpha$ is $3.1623\cdot 2^{-1}=1.581$. For level 2, the sharpening multiplier $\mu^2=R\cdot 2^{\alpha\cdot 2}$ is $3.1623\cdot 2^{-1\cdot 2}=0.791$.

Figure 31:
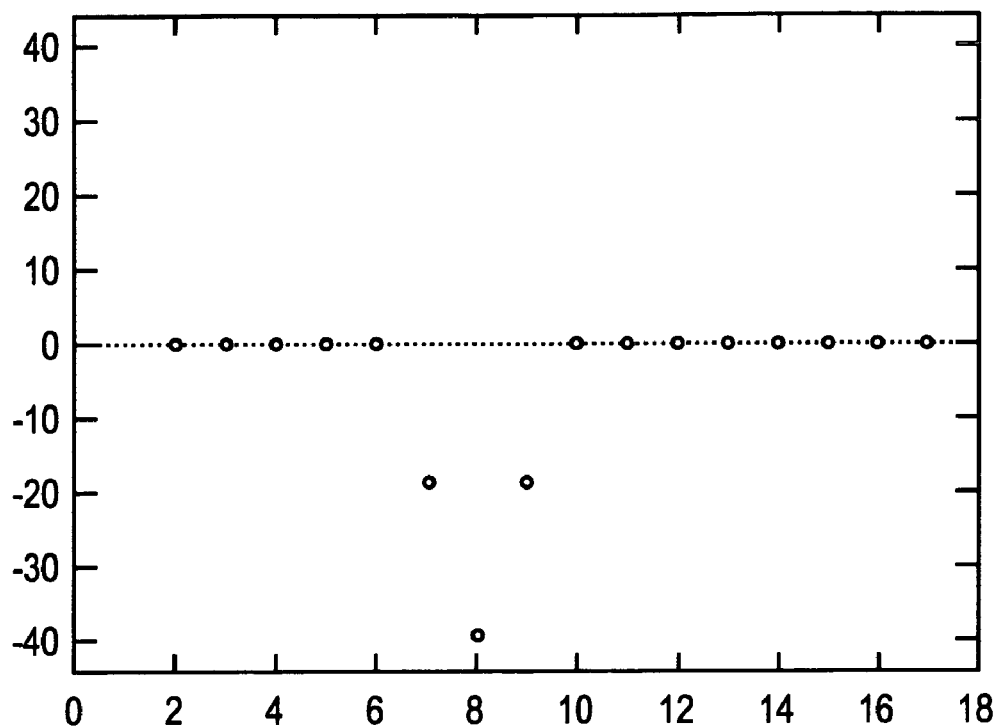
FIG. 31 shows the level 2 denoised and sharpened coefficients resulting from performing the sharpening.

FIG. 31 shows the level 2 denoised and sharpened coefficients resulting from performing the sharpening.

Figure 32:
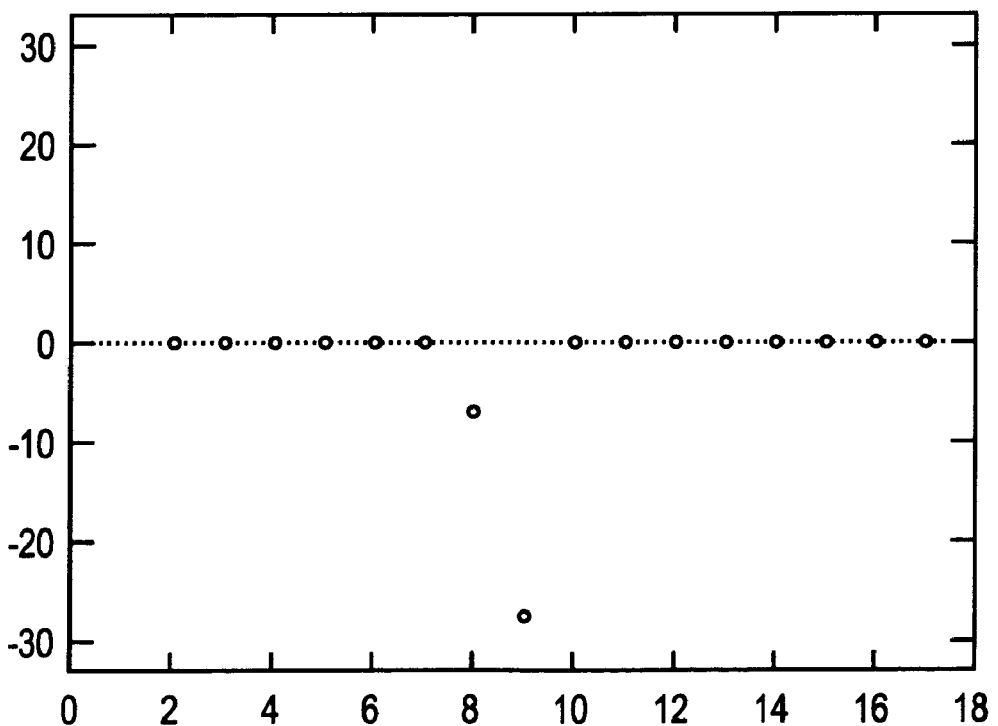
FIG. 32 shows denoised level 1 high pass coefficients.
Figure 33:
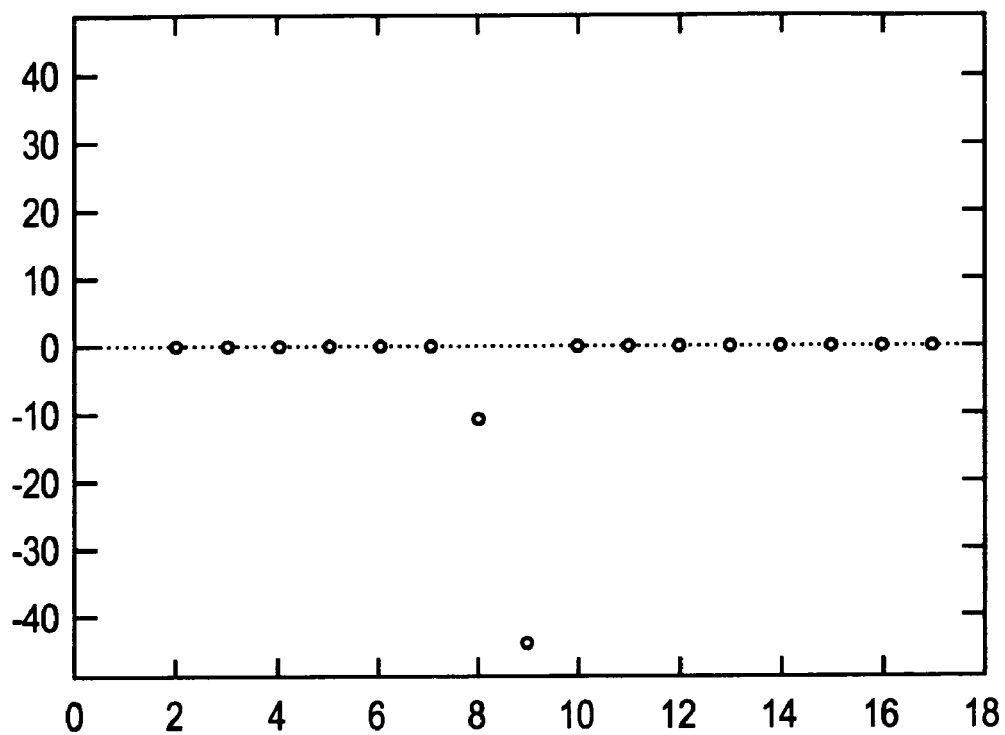
FIG. 33 shows the level 1 denoised and sharpened high pass coefficients.

For level 1, to keep the edge but eliminate the texture, the level 2 coefficients are used to control denoising instead of thresholding based on level 1 coefficients. In this example, all level 1 coefficients are set to zero where the corresponding level 2 coefficient is zero or has a different sign. FIG. 32 shows the denoised level 1 high pass coefficients that result from this denoising. FIG. 33 shows the level 1 denoised and sharpened high pass coefficients that result from this denoising.

Figure 34:
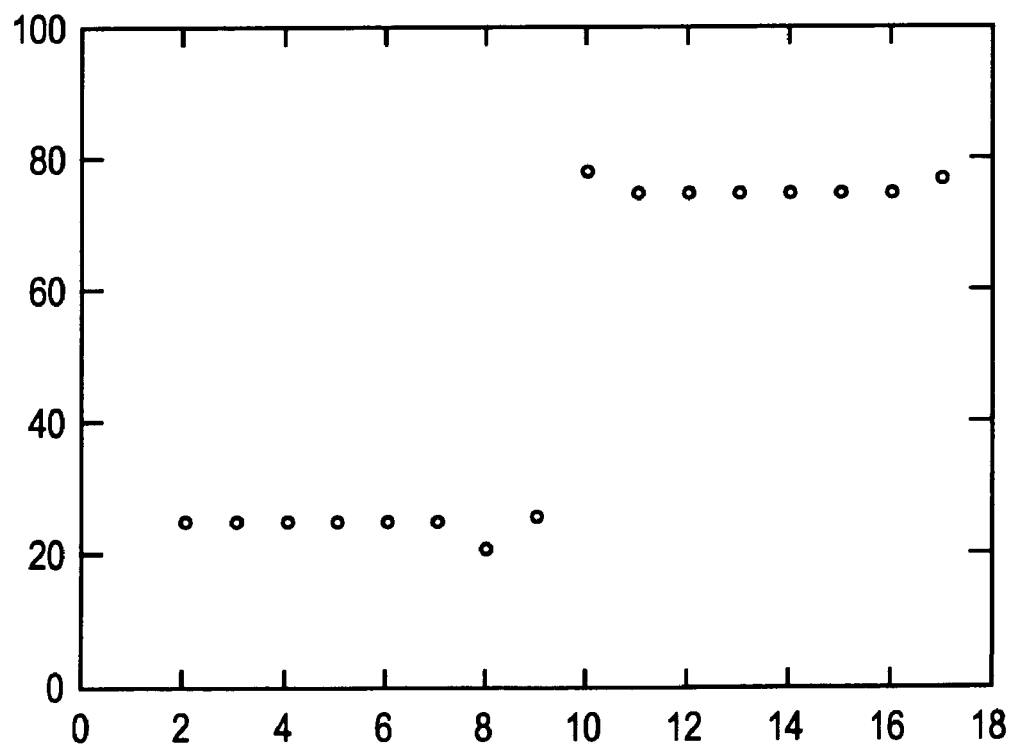
FIG. 34 shows the preprocessed results after wavelet denoising.

FIG. 34 shows the preprocessed results after wavelet denoising.

Figure 35:
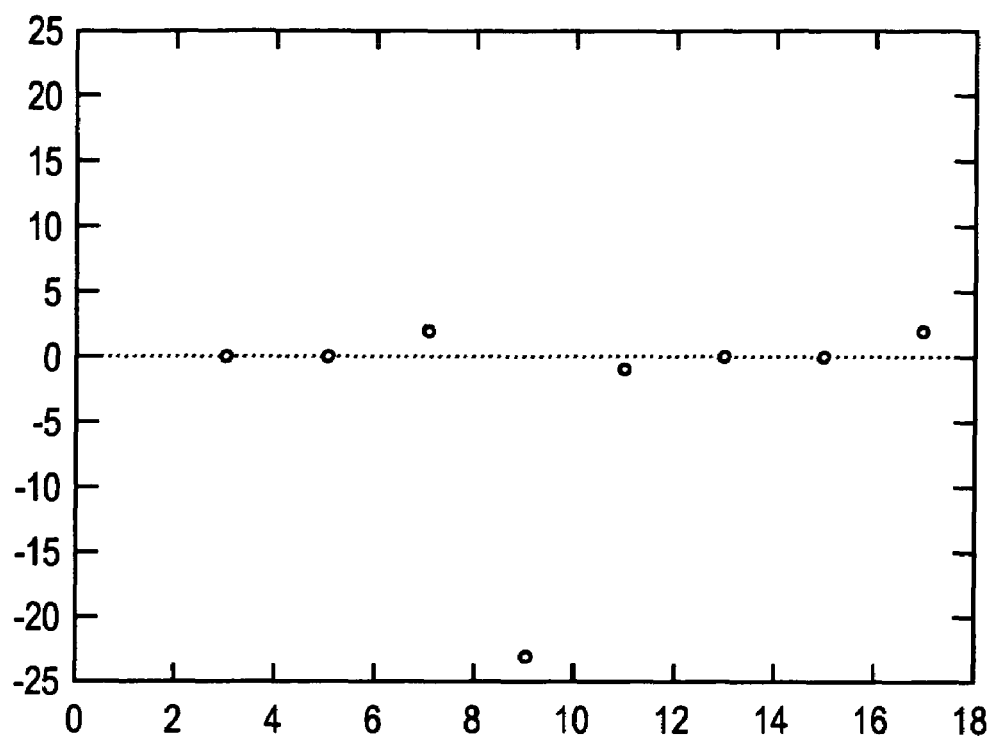
FIG. 35 shows the high pass filter result from application of the 5-3 filter.
Figure 36:
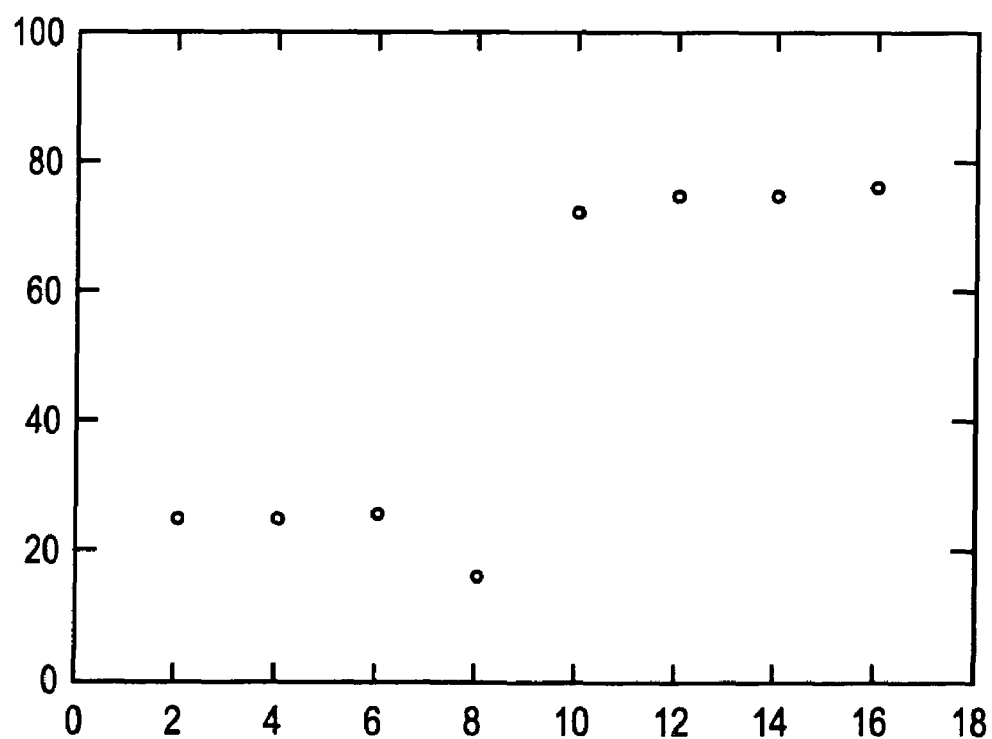
FIG. 36 shows the low pass filter result from application of the 5-3 filter.

Now, the 5-3 filter is applied for encoding. FIG. 35 shows the high pass filter result from application of the 5-3 filter. FIG. 36 shows the low pass filter result from application of the 5-3 filter.

Figure 37:
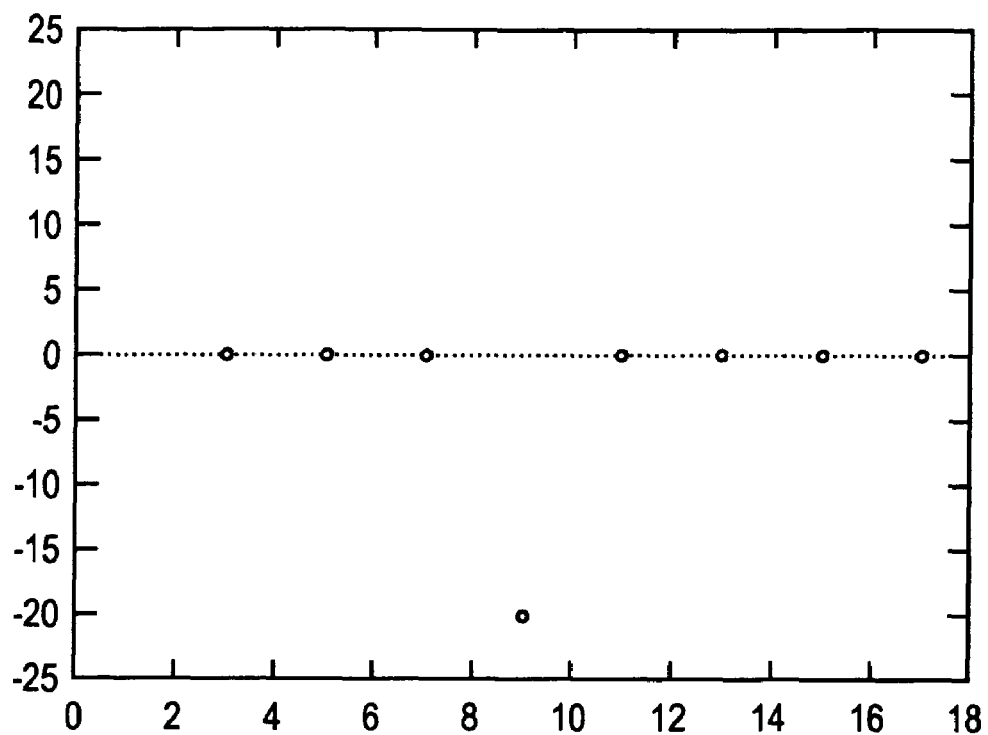
FIG. 37 shows the high pass coefficients after quantization with Q equal to 8.

FIG. 37 shows the high pass coefficients after quantization with Q equal to 8. Note that the coefficient at the edge is larger than the corresponding coefficient without WSS.

Figure 38:
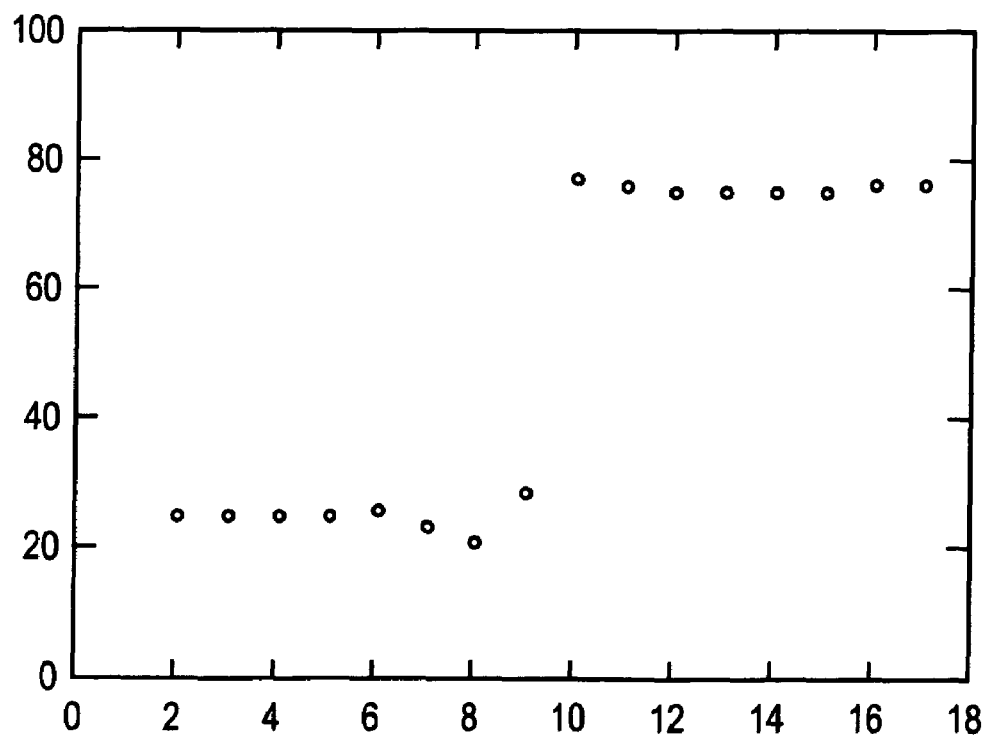
FIG. 38 shows the pre-processing provides a good improvement in quality for a small increase in rate.

The result after reconstruction is shown in FIG. 38. This closer to a step edge than the reconstruction without WSS when Q is equal to 16. J2K uses sophisticated, adaptive coding techniques. The exact differences in the amount of compressed data for "no pre-processing, Q=8," "pre-processing, Q=8" and "no pre-processing, Q=16" cannot be determined from a 1D example. However, in general the amount of compressed data for "pre-processing, Q=8" is only a little more than for "no pre-processing, Q=16" and significantly less than "no pre-processing, Q=8". FIG. 38 shows the pre-processing provides a good improvement in quality for a small increase in rate.

Source Code for Examples

```python
#!/usr/bin/env python
# WSS and JPEG 2000 filtering examples
# This is Python language software, see www.python.org.
# Copyright 2001 Ricoh Innovations Inc.
import sys
import math
data_1 = [20, 20, 20, 20, 20, 80, 80, 80, 80, 80, 80,
20, 20, 20, 20, 20]
data_2 = [20, 30, 20, 30, 20, 30, 20, 30, 70, 80, 70,
80, 70, 80, 70, 80]
def print_data(data, *arg):
    isfloat = 0
    for i in data:
        if type(i) == type(1.0):
            isfloat = 1
    for i in data:
        if not isfloat:
            print "%3d " % i,
        elif int(i*10+0.5) == int(i+0.5) *10:
            print "%d" % int(i),
        else:
            print "%1.1f" % i,
    print ""
def mirror_53_for(data):
    """"Odd symetric extension for before forward
transform,
    JPEG 2000 Compliant"""
    data = data[:] # make a copy
    data.insert(0, data[1]) # b | a b
    data.insert(0, data[3]) # c b | a b c
    data.append(data[len(data) -2])
    data.append(data[len(data) -4])
    return data
def mirror_53_inv(data):
    """"Symetric extension for before inverse transform,
JPEG 2000 Compliant"""
    data = data[:] # make a copy
    data.insert(0, data[0])
    data.append(data[len(data) -1])
    return data
def mirror_Haar_for(data, level):
    """"Mirror extension for redundant Haar forward
transform"""
    data = data[:] + data[-level:]
    return data
def mirror_Haar_inv(data, level):
    """"Mirror extension for redundant Haar inverse
transform"""
    data = data[:level] + data[:]
    return data
def f53_for(data):
    """ Apply 5-3 forward wavelet transfrom"""
    data = mirror_53_for(data)
    high = [ ]
    for i in range((len(data)-2) /2):
        c = data[2*i+1]-((data[2*i]+data[2*i+2])>>1)
        high.append(c)
    low =[ ]
    for i in range((len(data)-4) / 2):
        c = data[2*i+2]+((high[i]+ high[i+1]+2)>>2)
        low.append(c)
    return (low, high[1:])
def f53_inv(low, high):
    """"Apply 5-3 forward wavelet transfrom"""
    high = mirror_53_inv(high)
    even = [ ]
    for i in range(len(low)):
        c = low[i]-((high[i]+high[i+1]+2)>>2)
        even.append(c)
    result = [ ]
    even_mirror = mirror_53_inv(even)
    for i in range(len(low)):
        c = high[i+1]+((even_mirror[i+1]+even_mirror [i+2])>>1)
        result.append(even[i])
        result.append(c)
    return result
def quant(data, Q):
    """"Quantize and inverse quantize coefficients"""
    quant = [ ]
    for i in data:
        if i < 0:
            c = -(-i/Q)
            if c < 0:
                c = c * Q - (Q >> 1)
        else:
            c = i/Q
            if c > 0:
                c = c * Q + (Q >> 1)
        quant.append(c)
    return quant
def redundant_Haar_fwd(data, level):
    """ Redundant Haar wavelet forward transform. Not
normalized."""
    data = mirror_Haar_for(data, level)
    high = [ ]
    low = [ ]
    sq2 = math.sqrt(2)
    for i in range(len(data)-level):
        low.append((data[i]+data[i+level])/sq2)
        high.append((data[i]-data[i+level])/sq2)
    return (low, high)
def redundant_Haar_inv(low, high, level):
    """ Redundant Haar wavelet forward transform. Not
normalized."""
    low = mirror_Haar_inv(low, level)
    high = mirror_Haar_inv(high, level)
    data = [ ]
    sq2 = math.sqrt(2)
    for i in range(level, len(low)):
        d0 = low[i]+high[i]
        d1 = low[i-level]-high[i-level]
        d = (d0 + d1) / (2 * sq2)
        data.append(int(d+0.5))
    return data
def threshold(data, T):
    """"Threshold to denoise"""
    result = [ ]
    for i in data:
        if abs(i) < T:
            i = 0
        result.append(i)
    return result
def simple_threshold(list, Q, prefix):
    result = [ ]
    level = 1
    for data in list:
        T = int(Q*0.0707+0.5)
        r = threshold(data, T)
        plot (r, prefix+("level%d_thresh" % level))
        result.append(r)
        level = level + 1
    return result
def sign(n):
    if n < 0:
        return -1
    if n > 0:
        return 1
    return 0
def level2_threshold(list, Q, prefix):
    (data1, data2) = list
    result1 = [ ]
    result2 = [ ]
    T = int(Q*0.0707+0.5)
    for i in range(len(data1)):
        v1 = data1[i]
        v2 = data2[i]
        if abs(v2) < T:
            v1 = 0
            v2 = 0
        if sign(v1) != sign(v2):
            v1 = 0
        result1.append(v1)
        result2.append(v2)
    plot (result1, prefix+"level1_thresh")
    plot (result2, prefix+"level2_thresh")
```

```
            return (result1, result2)
    def smooth_sharpen(data, multiplier):
        result = [ ]
        for i in data:
            result.append(i*multiplier)
        return result
    def mse(x1, x2)
        if len(x1) != len(x2):
            return none;
        mse = 0.0
        for i in range(len(x1)):
            d = float(x1[i] - x2[i])
            mse = mse + d * d
        mse = mse / float(len(x1))
        return mse
    def WSS(data, Q, threshold_func, sharpen, prefix):
        print "\nHaar forward"
        (low_Haar1, high_Haar1) = redundant_Haar_fwd(data, 1)
        plot (low_Haar1, prefix+"_Haar1_low")
        plot (high_Haar1, prefix+"_Haar1_high")
        (low_Haar2, high_Haar2) =
    redundant_Haar_fwd(low_Haar1, 2)
        plot (low_Haar2, prefix+"_Haar2 low")
        plot (high_Haar2, prefix+"_Haar2_high")
        print "\nThreshold"
        (high_thresh1, high_thresh2) =
    threshold_func((high_Haar1, high_Haar2),
    prefix)
                                                        Q,
    prefix
        print "\nSmooth/sharpen"
        high_ss1 = smooth_sharpen(high_thresh1, sharpen[0])
        high_ss2 = smooth_sharpen(high_thresh2, sharpen[1])
        plot (high_ss1, prefix+"_ss1")
        plot (high_ss2, prefix+"_ss2")
        print "\nHaar inverse"
        low_Haar1_reconstruct =
    redundant_Haar_inv(low_Haar2, high_ss2, 2)
        plot (low_Haar1_reconstruct, prefix+"_WSS_2only")
        result = redundant_Haar_inv(low_Haar1, high_ss1, 1)
        plot (result, prefix+"_WSS")
        return result
    def j2k(data, Q, prefix):
        print "\n5-3 wavelet transform with Q=%d" % Q
        (low, high) = f53_for(data)
        plot (low, prefix + "_53low")
        plot (high, prefix + "_53high")
        high_quant = quant(high, Q)
        plot (high_quant, prefix + ("_53_high_Q%d" % Q))
        reconstructed = f53_inv(low, high_quant)
        plot (reconstructed, prefix+("_Q%d" % Q))
        return reconstructed
    def example1(data):
        print "Example 1"
        Q = 16
        plot(data, "e1_input")
        reconstructed = j2k(data, Q, "e1")
        print "MSE without denoising = %f" % mse (data,
    reconstructed)
        wss_postprocess = WSS(reconstructed, Q,
    simple_threshold, (1.29, 0.913), "e1")
        print "MSE with denoising    = %f" % mse (data,
    wss_postprocess)
    def example2 (data):
        print "Example 2"
        plot(data, "e2_input")
        j2k(data, 8, "e2")
        j2k(data, 16, "e2")
        wss_preprocess = WSS(data, 8, level2_threshold,
    (1.581, 0.791),
                            "e2")
        j2k(wss_preprocess, 8, "e2_wss_")
    ####################################################
    #
    # MAIN
    #
    ####################################################
    if_name_ == '_main_':
        if (len(sys.argv) > 1) and (sys.argv[1] == "-p"):
            import make_plot
            plot = make_plot.plot
        else:
            plot = print_data
        example1(data_1)
        print
    "\n==============================================\n
    "
        example2(data_2)
```

Text Output of Source Code for Examples

Example 1

| 20 | 20 | 20 | 20 | 20 | 80 | 80 | 80 | 80 | 80 | 80 | 20 | 20 | 20 | 20 | 20 |
|---|---|---|---|---|---|---|---|---|---|---|---|---|---|---|---|

5-3 wavelet transform with Q = 16

| 20 | 20 | 28 | 88 | 80 | 73 | 13 | 20 | | | | | | | | |
|---|---|---|---|---|---|---|---|---|---|---|---|---|---|---|---|
| 0 | 0 | 30 | 0 | 0 | −30 | 0 | 0 | | | | | | | | |
| 0 | 0 | 24 | 0 | 0 | −24 | 0 | 0 | | | | | | | | |
| 20 | 20 | 20 | 21 | 22 | 76 | 82 | 81 | 80 | 79 | 79 | 25 | 19 | 19 | 20 | 20 |

MSE without denoising = 3.437500
Haar forward

| 28.3 | 28.3 | 28 | 30.4 | 69.3 | 111.7 | 115.3 | 113.8 | 112.4 | 111.7 | 73.5 | 31.1 | 26.9 | 27.6 | 28.3 | 28.3 |
|---|---|---|---|---|---|---|---|---|---|---|---|---|---|---|---|
| 0 | 0 | −0.7 | −0.7 | −38.2 | −4.2 | 0.7 | 0.7 | 0.7 | 0 | 38.2 | 4.2 | 0 | −0.7 | 0 | 0 |
| 40.5 | 41.5 | 69.5 | 100.5 | 130.5 | 159.5 | 160 | 159.5 | 131.5 | 100 | 70 | 41.5 | 38 | 39.5 | 39 | 39 |
| −0.5 | −1.5 | −28.5 | −57.5 | −32.5 | −1.5 | 1 | 1.5 | 27.5 | 56 | 33 | 2.5 | −1.0 | −0.5 | 0 | 0 |

Threshold

| 0 | 0 | 0 | 0 | −38.20 | 0 | 0 | 0 | 0 | 38.2 | 0 | 0 | 0 | 0 | | |
|---|---|---|---|---|---|---|---|---|---|---|---|---|---|---|---|
| 0 | 0 | −28.5 | −57.5 | −32.5 | 0 | 0 | 0 | 27.5 | 56 | 33 | 0 | 0 | 0 | 0 | 0 |

Smooth/sharpen

| 0 | 0 | 0 | 0 | −49.3 | 0 | 0 | 0 | 0 | 49.3 | 0 | 0 | 0 | 0 | | |
|---|---|---|---|---|---|---|---|---|---|---|---|---|---|---|---|
| 0 | 0 | −26.0 | −52.5 | −29.7 | 0 | 0 | 0 | 25.1 | 52 | 30.1 | 0 | 0 | 0 | 0 | 0 |

Haar inverse

| 29 | 29 | 30 | 32 | 69 | 110 | 114 | 113 | 112 | 110 | 73 | 32 | 28 | 29 | 28 | 28 |
|---|---|---|---|---|---|---|---|---|---|---|---|---|---|---|---|

-continued

| | | | | | | | | | | | | | | | |
|---|---|---|---|---|---|---|---|---|---|---|---|---|---|---|---|
| 20 | 20 | 20 | 21 | 18 | 81 | 80 | 81 | 80 | 79 | 83 | 20 | 21 | 19 | 20 | 20 |

MSE with denoising = 1.187500

==========================================================

Example 2

| | | | | | | | | | | | | | | | |
|---|---|---|---|---|---|---|---|---|---|---|---|---|---|---|---|
| 20 | 30 | 20 | 30 | 20 | 30 | 20 | 30 | 70 | 80 | 70 | 80 | 70 | 80 | 70 | 80 |

5-3 wavelet transform with Q = 8

| | | | | | | | | | | | | | | | |
|---|---|---|---|---|---|---|---|---|---|---|---|---|---|---|---|
| 25 | 25 | 25 | 19 | 69 | 75 | 75 | 75 | | | | | | | | |
| 10 | 10 | 10 | −15 | 10 | 10 | 10 | 10 | | | | | | | | |
| 12 | 12 | 12 | −12 | 12 | 12 | 12 | 12 | | | | | | | | |
| 19 | 31 | 19 | 31 | 19 | 31 | 19 | 32 | 69 | 81 | 69 | 81 | 69 | 81 | 69 | 81 |

5-3 wavelet transform with Q = 16

| | | | | | | | | | | | | | | | |
|---|---|---|---|---|---|---|---|---|---|---|---|---|---|---|---|
| 25 | 25 | 25 | 19 | 69 | 75 | 75 | 75 | | | | | | | | |
| 10 | 10 | 10 | −15 | 10 | 10 | 10 | 10 | | | | | | | | |
| 0 | 0 | 0 | 0 | 0 | 0 | 0 | 0 | | | | | | | | |
| 25 | 25 | 25 | 25 | 25 | 22 | 19 | 44 | 69 | 72 | 75 | 75 | 75 | 75 | 75 | 75 |

Haar forward

| | | | | | | | | | | | | | | | |
|---|---|---|---|---|---|---|---|---|---|---|---|---|---|---|---|
| 35.4 | 35.4 | 35.4 | 35.4 | 35.4 | 35.4 | 35.4 | 70.7 | 106.1 | 106.1 | 106.1 | 106.1 | 106.1 | 106.1 | 106.1 | 113.1 |
| −7.1 | 7.1 | −7.1 | 7.1 | −7.1 | 7.1 | −7.1 | −28.3 | −7.1 | 7.1 | −7.1 | 7.1 | −7.1 | 7.1 | −7.1 | 0 |
| 49 | 49 | 49 | 49 | 49 | 74 | 99 | 124 | 149 | 149 | 149 | 149 | 149 | 154 | 149 | 159 |
| 0 | 0 | 0 | 0 | 0 | −25.0 | −50.0 | −25.0 | 0 | 0 | 0 | 0 | 0 | −5.0 | 0 | 0 |

Threshold

| | | | | | | | | | | | | | | | |
|---|---|---|---|---|---|---|---|---|---|---|---|---|---|---|---|
| 0 | 0 | 0 | 0 | 0 | 0 | −7.1 | −28.3 | 0 | 0 | 0 | 0 | 0 | 0 | 0 | 0 |
| 0 | 0 | 0 | 0 | 0 | −25.0 | −50.0 | −25.0 | 0 | 0 | 0 | 0 | 0 | 0 | 0 | 0 |

Smooth/sharpen

| | | | | | | | | | | | | | | | |
|---|---|---|---|---|---|---|---|---|---|---|---|---|---|---|---|
| 0 | 0 | 0 | 0 | 0 | 0 | −11.2 | −44.7 | 0 | 0 | 0 | 0 | 0 | 0 | 0 | 0 |
| 0 | 0 | 0 | 0 | 0 | −19.8 | −39.6 | −19.8 | 0 | 0 | 0 | 0 | 0 | 0 | 0 | 0 |

Haar inverse

| | | | | | | | | | | | | | | | |
|---|---|---|---|---|---|---|---|---|---|---|---|---|---|---|---|
| 35 | 35 | 35 | 35 | 35 | 37 | 39 | 71 | 102 | 104 | 106 | 106 | 106 | 108 | 106 | 111 |
| 25 | 25 | 25 | 25 | 25 | 25 | 21 | 26 | 78 | 75 | 75 | 75 | 75 | 75 | 75 | 77 |

5-3 wavelet transform with Q = 8

| | | | | | | | | | | | | | | | |
|---|---|---|---|---|---|---|---|---|---|---|---|---|---|---|---|
| 25 | 25 | 26 | 16 | 72 | 75 | 75 | 76 | | | | | | | | |
| 0 | 0 | 2 | −23 | 1 | 0 | 0 | 2 | | | | | | | | |
| 0 | 0 | 0 | −20 | 0 | 0 | 0 | 0 | | | | | | | | |
| 25 | 25 | 25 | 25 | 26 | 23 | 21 | 29 | 77 | 76 | 75 | 75 | 75 | 75 | 76 | 76 |

An Exemplary Computer System

Figure 39:
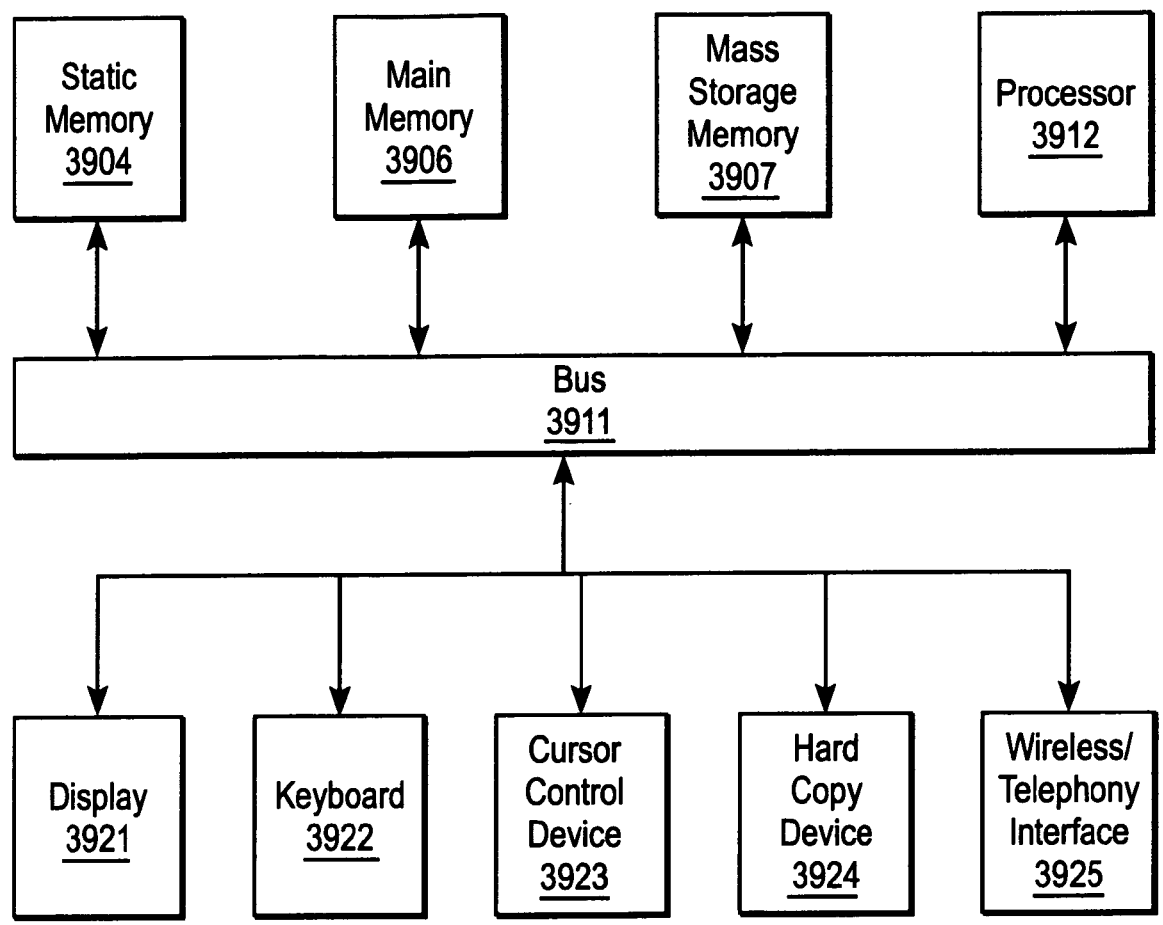
FIG. 39 is a block diagram of a computer system.

One or more of the operations described above may be implemented or performed with a computer system such as shown in FIG. 39. Referring to FIG. 39, computer system 3900 may comprise an exemplary client or server computer system in which the features described herein may be implemented. Computer system 3900 comprises a communication mechanism or bus 3911 for communicating information, and a processor 3912 coupled with bus 3911 for processing information. Processor 3912 includes a microprocessor, but is not limited to a microprocessor, such as Pentium™, PowerPC™, Alpha™, etc.

System 3900 further comprises a random access memory (RAM), or other dynamic storage device 3904 (referred to as main memory) coupled to bus 3911 for storing information and instructions to be executed by processor 3912. Main memory 3904 also may be used for storing temporary variables or other intermediate information during execution of instructions by processor 3912.

Computer system 3900 also comprises a read only memory (ROM) and/or other static storage device 3906 coupled to bus 3911 for storing static information and instructions for processor 3912, and a data storage device 3907, such as a magnetic disk or optical disk and its corresponding disk drive. Data storage device 3907 is coupled to bus 3911 for storing information and instructions.

Computer system 3900 may further be coupled to a display device 3921, such as a cathode ray tube (CRT) or liquid crystal display (LCD), coupled to bus 3911 for displaying information to a computer user. An alphanumeric input device 3922, including alphanumeric and other keys, may also be coupled to bus 3911 for communicating information and command selections to processor 3912. An additional user input device is cursor control 3923, such as a mouse, trackball, trackpad, stylus, or cursor direction keys, coupled to bus 3911 for communicating direction information and command selections to processor 3912, and for controlling cursor movement on display 3921.

Another device that is coupled to bus 3911 is hard copy device 3924 operating as a print engine, which may be used for printing images, instructions, data, or other information on a medium such as paper, film, or similar types of media. A scanner 3930 is coupled to bus 3911 to generate a scanned image.

Furthermore, a sound recording and playback device, such as a speaker and/or microphone may optionally be coupled to bus 3911 for audio interfacing with computer system 3900.

Note that any or all of the components of system 3900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   characterizing quantization noise in reconstructed data generated in response to application of an inverse wavelet transform;
   removing the quantization noise from the reconstructed data constructed during decoding, including
      applying an M-level forward transform to LL components, thresholding coefficients,
      rescaling of coefficients after thresholding the coefficients, and
      applying a M-level inverse transform to thresholded coefficients to create denoised LL components.

2. The method defined in claim 1 wherein removing the quantization noise comprises performing wavelet denoising using an enhancement wavelet transform.

3. The method defined in claim 2 wherein the enhancement wavelet transform is a different transform than the inverse wavelet transform.

4. The method defined in claim 2 wherein the enhancement wavelet transform is the same transform than the inverse wavelet transform.

5. The method defined in claim 2 wherein performing wavelet denoising comprises applying the enhancement wavelet transform on a subset of all decomposition levels to which the inverse transform is to be applied.

6. The method defined in claim 5 wherein the subset of decomposition levels comprise a set of consecutive decomposition levels.

7. The method defined in claim 5 wherein the subset of decomposition levels comprise a set of non-consecutive decomposition levels.

8. The method defined in claim 1 wherein the inverse wavelet transform is part of a JPEG 2000 decoder and is applied as part of using the decoder on a JPEG 2000 codestream.

9. The method defined in claim 2 wherein performing wavelet denoising comprises controlling denoising using level 2 enhancement wavelet transform coefficients.

10. The method defined in claim 9 wherein controlling denoising comprises setting all level 1 enhancement wavelet transform coefficients to zero where a corresponding level 2 coefficient is zero or has a different sign.

11. The method defined in claim 1 wherein the quantization noise depends on quantization performed and the inverse wavelet transform applied.

12. The method defined in claim 1 further comprising:
   decoding image data, including applying the inverse wavelet transform to compression wavelet transform coefficients at level L to generate samples at enhancement wavelet transform level L−1 having quantization noise.

13. The method defined in claim 12 further comprising repeatingly applying the inverse wavelet transform and removing quantization noise after each application of the inverse wavelet transform.

14. The method defined in claim 1 further comprising performing a deblurring operation on the reconstructed samples to enhance sharpness of an image.

15. The method defined in claim 1 wherein thresholding coefficients comprises determining a threshold based on a scalar quantizer Q, where Q is a rational number.

16. The method defined in claim 15 wherein the threshold is $$\frac{1}{\sqrt{2}} Q.$$

17. The method defined in claim 16 wherein the inverse wavelet transform is a one dimensional, 5,3 wavelet transform.

18. The method defined in claim 15 wherein the threshold is 1.5Q.

19. The method defined in claim 18 wherein the inverse wavelet transform is a two dimensional, 5,3 wavelet transform.

20. The method defined in claim 15 wherein the inverse wavelet transform is a Daubechies 9,7 filter.

21. The method defined in claim 15 wherein the scalar quantizer Q is determined from headers in a JPEG 2000 codestream.

22. The method defined in claim 1 wherein at least two thresholds are used for different regions of samples.

23. The method defined in claim 22 wherein different regions of samples correspond to different codeblocks of wavelet coefficients.

24. The method defined in claim 22 wherein different samples have different last coding passes.

25. The method defined in claim 1 wherein M equals 1.

26. The method defined in claim 1 wherein the forward and inverse transforms are forward and inverse Harr transforms.

27. The method defined in claim 1 wherein rescaling components comprises multiplying non-zero coefficients at level m by $R^{1/l} \cdot 2^{m\alpha}$, where m equals 1 ... M, where $\alpha$ is the parameter that determines the degree of smoothing or sharpening and R is the renormalization constant that preserves the norm of an image.

28. The method defined in claim 1 wherein thresholding of coefficients comprises setting a wavelet coefficient to zero if the absolute value of the wavelet coefficient is less than a threshold and not changing the wavelet coefficient if its absolute value is greater than or equal to the threshold.

29. The method defined in claim 1 wherein characterizing quantization noise comprises computing differences between neighboring samples.

30. The method defined in claim 1 wherein the quantization noise is not uniformally distributed throughout the reconstructed data.

31. The method defined in claim 1 wherein the quantization noise is not continuous throughout the reconstructed data.

32. The method defined in claim 1 wherein the quantization noise has discrete values.

33. The method defined in claim 1 wherein the quantization noise has rational values.

34. The method defined in claim 33 wherein the inverse wavelet transform is applied using a rational wavelet filter.

35. The method defined in claim 1 wherein characterizing quantization noise comprises characterizing scalar quantization of wavelet coefficients.

36. The method defined in claim 1 wherein the quantization noise is scalar quantization noise.

37. The method defined in claim 13 wherein the threshold comprises an average of thresholds corresponding to the maximal approximation error of four neighboring samples.

38. The method defined in claim 13 wherein the threshold comprises a maximum of thresholds corresponding to the maximal approximation error of four neighboring samples.

39. A method comprising:
characterizing quantization noise in reconstructed data generated in response to application of an inverse wavelet transform; and
removing the quantization noise from the reconstructed data constructed during decoding, including
applying an M-level forward transform to LL components, thresholding coefficients, and
applying a M-level inverse transform to thresholded coefficients to create denoised LL components,
wherein thresholding coefficients comprises determining a threshold based on a scalar quantizer Q, where Q is a rational number, and
wherein scalar quantizer Q is equal to $2^{M_b-(P+C-\chi)} \cdot \Delta_b$ where
$M_b$ is $G+\epsilon_b-1$ where G is a number of guard bits and $\epsilon_b$ is an exponent indicated in a first tag in a codestream,
$(P+C-\chi)$ is the number of bitplanes decoded, and $\Delta_b$ is indicated in a second tag in the codestream.

40. A method comprising:
characterizing quantization noise in reconstructed data generated in response to application of an inverse wavelet transform; and
removing the quantization noise from the reconstructed data constructed during decoding, including
applying an M-level forward transform to LL components, thresholding coefficients, and
applying a M-level inverse transform to thresholded coefficients to create denoised LL components, wherein thresholding of coefficients comprises shrinking a value of wavelet coefficient toward zero by an amount of a threshold if the absolute value of the wavelet coefficient is greater than or equal to the threshold.

41. A decoder comprising:
an inverse wavelet filter unit to apply an inverse wavelet transform;
a quantization noise characterization unit to characterize quantization noise in reconstructed data generated in response to application of the inverse wavelet transform; and
a quantization noise removal unit to remove the quantization noise from the reconstructed data constructed during decoding, including
applying an M-level forward transform to LL components,
thresholding coefficients, wherein the quantization noise removal unit rescales coefficients after thresholding the coefficients, and
applying a M-level inverse transform to thresholded coefficients to create denoised LL components.

42. The decoder defined in claim 41 wherein the quantization noise removal block comprises a denoising unit to perform wavelet denoising using an enhancement wavelet transform.

43. The decoder defined in claim 42 wherein the enhancement wavelet transform is a different transform than the inverse wavelet transform.

44. The decoder defined in claim 42 wherein the enhancement wavelet transform is the same transform than the inverse wavelet transform.

45. The decoder defined in claim 42 wherein performing wavelet denoising comprises applying the enhancement wavelet transform on a subset of all decomposition levels to which the inverse transform is to be applied.

46. The decoder defined in claim 45 wherein the subset of decomposition levels comprise a set of consecutive decomposition levels.

47. The decoder defined in claim 45 wherein the subset of decomposition levels comprise a set of non-consecutive decomposition levels.

48. The method defined in claim 42 wherein the inverse wavelet transform is part of a JPEG 2000 decoder and is applied as part of using the decoder on a JPEG 2000 codestream.

49. The decode defined in claim 42 wherein the denoising unit performs a deblurring operation on reconstructed samples to enhance sharpness of an image.

50. The decoder defined in claim 41 wherein the quantization noise depends on quantization performed and the inverse wavelet transform applied.

51. The decoder defined in claim 41 wherein the inverse wavelet filter unit applies the inverse wavelet transform to compression wavelet coefficients at level L to generate samples at the enhancement wavelet transform level L−1 having quantization noise.

52. The decoder defined in claim 50 wherein the inverse transform unit repeatedly applies the inverse wavelet transform and the quantization noise removal unit removes quantization noise after each application of the inverse wavelet transform.

53. The decoder defined in claim 41 wherein the quantization noise removal unit performs thresholding of coefficients by determining a threshold based on a scalar quantizer Q, where Q is a rational number.

54. The decoder defined in claim 41 wherein the quantization noise removal unit rescales components by multiplying non-zero coefficients at level m by $R^{1/l} \cdot 2^{m\alpha}$, where m equals 1 ... M, where α is the parameter that determines the degree of smoothing or sharpening and R is the renormalization constant that preserves the norm of an image.

55. The decoder defined in claim 41 wherein the quantization noise removal unit thresholds coefficients by setting a wavelet coefficient to zero if the absolute value of the wavelet coefficient is less than a threshold and not changing the wavelet coefficient if its absolute value is greater than or equal to the threshold.

56. A decoder comprising:
an inverse wavelet filter unit to apply an inverse wavelet transform;
a quantization noise characterization unit to characterize quantization noise in reconstructed data generated in response to application of the inverse wavelet transform; and
a quantization noise removal unit to remove the quantization noise from the reconstructed data constructed during decoding, including
applying an M-level forward transform to LL components, thresholding coefficients, and
applying a M-level inverse transform to thresholded coefficients to create denoised LL components,
wherein the quantization noise removal unit thresholds coefficients by shrinking a value of wavelet coefficient toward zero by an amount of a threshold if the absolute value of the wavelet coefficient is greater than or equal to the threshold.

57. A decoder comprising:
an inverse wavelet filter unit to apply an inverse wavelet transform;
a quantization noise characterization unit to characterize quantization noise in reconstructed data generated in response to application of the inverse wavelet transform; and a quantization noise removal unit to remove the quantization noise from the reconstructed data constructed during decoding, including
　applying an M-level forward transform to LL components, thresholding coefficients, and
　applying a M-level inverse transform to thresholded coefficients to create denoised LL components,
wherein thresholding is performed using a threshold, and further wherein the threshold comprises an average of thresholds corresponding to the maximal approximation error of four neighboring samples.

58. A decoder comprising:
an inverse wavelet filter unit to apply an inverse wavelet transform;
a quantization noise characterization unit to characterize quantization noise in reconstructed data generated in response to application of the inverse wavelet transform; and
a quantization noise removal unit to remove the quantization noise from the reconstructed data constructed during decoding, including
　applying an M-level forward transform to LL components, thresholding coefficients, and
　applying a M-level inverse transform to thresholded coefficients to create denoised LL components,
wherein thresholding is performed using a threshold, and further wherein the threshold comprises a maximum of thresholds corresponding to the maximal approximation error of four neighboring samples.

59. An article of manufacture comprising one or more computer-readable media with executable instructions stored thereon which, when executed by a system, cause the system to perform a method, the method including
characterizing quantization noise in reconstructed data generated in response to application of an inverse wavelet transform; and
removing the quantization noise from the reconstructed data constructed during decoding, including
　applying an M-level forward transform to LL components, thresholding coefficients, and
　applying a M-level inverse transform to thresholded coefficients to create denoised LL components,
wherein thresholding coefficients comprises determining a threshold based on a scalar quantizer Q, where Q is a rational number, and
wherein scalar quantizer Q is equal to $2^{M_b-(P+C-\chi)} \cdot \Delta_b$ where
　$M_b$ is $G+\epsilon_b-1$ where G is a number of guard bits and $\epsilon_b$ is an exponent indicated in a first tag in a codestream,
　$(P+C-\chi)$ is the number of bitplanes decoded, and
　$\Delta_b$ is indicated in a second tag in the codestream.

60. An article of manufacture comprising one or more computer-readable media with executable instructions stored thereon which, when executed by a system, cause the system to perform a method, the method including
characterizing quantization noise in reconstructed data generated in response to application of an inverse wavelet transform;
removing the quantization noise from the reconstructed data constructed during decoding, including
　applying an M-level forward transform to LL components, thresholding coefficients,
　rescaling of coefficients after thresholding the coefficients, and
　applying a M-level inverse transform to thresholded coefficients to create denoised LL components.

61. The article of manufacture defined in claim 60 further comprising instructions which, when executed by the system, cause the system to remove the quantization noise comprises performing wavelet denoising using an enhancement wavelet transform.

62. The article of manufacture defined in claim 60 wherein the enhancement wavelet transform is a different transform than the inverse wavelet transform.

63. The article of manufacture defined in claim 62 wherein the enhancement wavelet transform is the same transform than the inverse wavelet transform.

64. The article of manufacture defined in claim 62 wherein the instructions to perform wavelet denoising comprises instructions to apply the enhancement wavelet transform on a subset of all decomposition levels to which the inverse transform is to be applied.

65. The article of manufacture defined in claim 64 wherein the subset of decomposition levels comprise a set of consecutive decomposition levels.

66. The article of manufacture defined in claim 64 wherein the subset of decomposition levels comprise a set of non-consecutive decomposition levels.

67. The article of manufacture defined in claim 60 wherein the inverse wavelet transform is part of a JPEG 2000 decoder and is applied as part of using the decoder on a JPEG 2000 codestream.

68. The article of manufacture defined in claim 60 wherein the quantization noise depends on quantization performed and the inverse wavelet transform applied.

69. The article of manufacture defined in claim 60 further comprising instructions which, when executed by the system, cause the system to:
decode image data, including applying the inverse wavelet transform to compression wavelet transform coefficients at level L to generate samples at enhancement wavelet transform level L−1 having quantization noise.

70. The article of manufacture defined in claim 60 further comprising instructions which, when executed by the system, cause the system to repeatedly apply the inverse wavelet transform and remove quantization noise after each application of the inverse wavelet transform.

71. The article of manufacture defined in claim 60 further comprising instructions which, when executed by the system, cause the system to perform a deblurring operation on the reconstructed samples to enhance sharpness of an image.

72. An article of manufacture comprising one or more computer-readable media with executable instructions stored thereon which, when executed by a system, cause the system to perform a method, the method including
characterizing quantization noise in reconstructed data generated in response to application of an inverse wavelet transform; and
removing the quantization noise from the reconstructed data constructed during decoding, including
　applying an M-level forward transform to LL components,
　thresholding coefficients, including shrinking a value of wavelet coefficient toward zero by an amount of a threshold if the absolute value of the wavelet coefficient is greater than or equal to the threshold, and
　applying a M-level inverse transform to thresholded coefficients to create denoised LL components.

* * * * *